(12) United States Patent
Nakada

(10) Patent No.: US 8,855,892 B2
(45) Date of Patent: Oct. 7, 2014

(54) CONTROL DEVICE FOR INTERNAL COMBUSTION ENGINE

(75) Inventor: Hayato Nakada, Minamitsuru-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/817,296

(22) PCT Filed: Sep. 8, 2010

(86) PCT No.: PCT/JP2010/065414
§ 371 (c)(1),
(2), (4) Date: Feb. 15, 2013

(87) PCT Pub. No.: WO2012/032618
PCT Pub. Date: Mar. 15, 2012

(65) Prior Publication Data
US 2013/0166176 A1    Jun. 27, 2013

(51) Int. Cl.
*F02M 25/07* (2006.01)
*F02D 41/00* (2006.01)
*F02D 45/00* (2006.01)
*F02M 25/00* (2006.01)
*F02D 41/14* (2006.01)
*F02B 29/04* (2006.01)
*F02B 37/24* (2006.01)

(52) U.S. Cl.
CPC ............ *F02D 45/00* (2013.01); *F02M 25/0727* (2013.01); *F02D 41/0007* (2013.01); *F02D 2041/1432* (2013.01); *F02M 25/0707* (2013.01); *F02D 2200/0406* (2013.01); *Y02T 10/47* (2013.01); *F02D 41/0072* (2013.01); *F02B 29/0406* (2013.01); *F02B 37/24* (2013.01); *F02D 2041/1426* (2013.01); *F02M 25/0713* (2013.01); *Y02T 10/144* (2013.01)
USPC .................... 701/103; 123/559.1; 123/568.21

(58) Field of Classification Search
USPC ............ 701/103, 102, 108; 123/559.1, 559.2, 123/561, 564, 565, 568.21
See application file for complete search history.

(56) References Cited

U.S. PATENT DOCUMENTS

| | | | |
|---|---|---|---|
| 6,035,640 A * | 3/2000 | Kolmanovsky et al. ..... | 60/605.2 |
| 6,076,353 A * | 6/2000 | Freudenberg et al. ....... | 60/605.2 |
| 6,155,230 A | 12/2000 | Iwano et al. | |
| 8,151,567 B2 * | 4/2012 | Rollinger et al. ............... | 60/602 |
| 8,621,864 B2 * | 1/2014 | Osburn et al. ................ | 60/605.2 |
| 2005/0155348 A1 | 7/2005 | Inoue | |
| 2008/0295513 A1* | 12/2008 | Rollinger et al. ............... | 60/602 |
| 2011/0094220 A1* | 4/2011 | Geyer et al. .................... | 60/602 |

FOREIGN PATENT DOCUMENTS

| | | |
|---|---|---|
| JP | A-11-006269 | 1/1999 |
| JP | A-11-62690 | 3/1999 |
| JP | A-2003-021000 | 1/2003 |
| JP | A-2005-207234 | 8/2005 |
| JP | A-2005-351199 | 12/2005 |

OTHER PUBLICATIONS

May 16, 2014 European Search report issued in EP Application No. 10856968.2.
Follinger; "Regelungstechnik Einfuhrung in die Methoden und ihre Anwendung;" Jan. 1, 1994; Huthig, Heidelberg; XP055116954; p. 285.

* cited by examiner

*Primary Examiner* — Mahmoud Gimie
(74) *Attorney, Agent, or Firm* — Oliff PLC

(57) ABSTRACT

The present invention relates to a control device for an internal combustion engine including a first control subject (35D) capable of controlling two different control amounts (Pim and Regr) influencing each other at a low frequency and second control subjects (52 and 33) capable of controlling the control amount at a high frequency. In the present invention, the first control amount and the second control amount are changed by the first control subject, and the first control amount and the second control amount are changed by the second control subject. Further, in the present invention, an operation amount (Mv) is input to the first control subject so that a first control amount deviation component (ΔPimL) with respect to a target value changing at a low frequency and a second control amount deviation component (ΔRegrL) with respect to the target value become zero, and operation amounts (Megr and Mth) are input to the second control subject so that a first control amount deviation component (ΔPimH) with respect to a target value changing at a high frequency and a second control amount deviation component (ΔRegrH) with respect to the target value become zero.

6 Claims, 8 Drawing Sheets

CONTROL DEVICE FOR INTERNAL COMBUSTION ENGINE

TECHNICAL FIELD

The present invention relates to a control device for an internal combustion engine.

BACKGROUND ART

A control device for an internal combustion engine is disclosed in Patent Document 1. The internal combustion engine disclosed in Patent Document 1 includes a supercharger and an exhaust gas recirculation device.

The supercharger is used to increase a pressure (hereinafter, this pressure is referred to as a "supercharging pressure") of a gas suctioned into a combustion chamber, and includes a compressor which is disposed in an intake passage, an exhaust turbine which is disposed in an exhaust passage, and a vane which increases or decreases a pressure (hereinafter, this pressure is referred to as an "exhaust pressure") of an exhaust gas inside the exhaust passage at the upstream side of the exhaust turbine. Further, when the exhaust pressure is increased by changing the operation state of the vane (more specifically, by decreasing the opening degree of the vane), the rotation speed of the exhaust turbine increases. Accordingly, the rotation speed of the compressor also increases, and thereby the supercharging pressure increases. Meanwhile, when the exhaust pressure is decreased by changing the operation state of the vane (more specifically, by increasing the opening degree of the vane), the rotation speed of the exhaust turbine decreases. Accordingly, the rotation speed of the compressor also decreases, and thereby the supercharging pressure decreases.

Further, the exhaust gas recirculation device (hereinafter, this device is referred to as an "EGR device") is used to introduce the exhaust gas into the combustion chamber by introducing the exhaust gas, discharged from the combustion chamber to the exhaust passage, into the intake passage, and includes a passage (hereinafter, this passage is referred to as an "EGR passage") extending from the exhaust passage at the upstream side of the exhaust turbine to the intake passage at the downstream side of the compressor and a control valve (hereinafter, this control valve is referred to as an "EGR control valve") which controls the flow rate of the exhaust gas flowing inside the passage. Further, when the flow rate of the exhaust gas flowing inside the EGR passage is increased by changing the operation state of the EGR control valve (more specifically, by increasing the opening degree of the EGR control valve), an amount (hereinafter, this amount is referred to as an "EGR gas amount") of the exhaust gas introduced into the intake passage increases, so that a ratio (hereinafter, this ratio is referred to as an "EGR ratio") of the EGR gas amount in the gas suctioned into the combustion chamber increases. Meanwhile, when the flow rate of the exhaust gas flowing inside the EGR passage is decreased by changing the operation state of the EGR control valve (more specifically, by decreasing the opening degree of the EGR control valve), the EGR gas amount decreases, so that the EGR ratio decreases.

Here, when the exhaust pressure is increased by changing the operation state of the vane, a difference between the exhaust pressure and the supercharging pressure increases, and the EGR gas amount increases, so that the EGR ratio increases. Meanwhile, when the exhaust pressure is decreased by changing the operation state of the vane, a difference between the exhaust pressure and the supercharging pressure decreases, and the EGR gas amount decreases, so that the EGR ratio decreases. In this way, when the operation state of the vane is changed so as to change the supercharging pressure, not only the supercharging pressure but also the EGR ratio change.

Meanwhile, when the EGR gas amount is increased by changing the operation state of the EGR control valve, the exhaust pressure decreases, and hence the supercharging pressure decreases. Meanwhile, when the EGR gas amount is decreased by changing the operation state of the EGR control valve, the exhaust pressure increases, and hence the supercharging pressure increases. In this way, when the operation state of the EGR control valve is changed so as to change the EGR gas amount, not only the EGR gas amount but also the supercharging pressure change.

Further, in this way, the change in the operation state of the vane influences not only the supercharging pressure but also the EGR gas amount and the change in the operation state of the EGR control valve influences not only the EGR gas amount but also the supercharging pressure. Accordingly, in the control device disclosed in Patent Document 1, when the operation amounts to be input to the vane and the EGR control valve are determined so as to change the operation state of the vane and the operation state of the EGR control valve so that the supercharging pressure and the EGR ratio are respectively controlled at the target supercharging pressure and the target EGR ratio, the aforementioned operation amounts are determined in consideration of the influence on the EGR gas amount due to the change in the operation state of the vane when the operation state of the vane is changed and the influence on the supercharging pressure due to the change in the operation state of the EGR control valve when the operation state of the EGR control valve is changed.

That is, the operation amounts to be input to the vane and the EGR control valve are determined by the cooperation of the control of the supercharging pressure due to the control of the operation state of the vane and the control of the EGR ratio due to the control of the operation state of the EGR control valve.

CITATION LIST

Patent Document

Patent Document 1: JP 2003-21000 A
Patent Document 2: JP 2005-207234 A
Patent Document 3: JP H11-62690 A

DISCLOSURE OF THE INVENTION

Problems to be Solved by the Invention

Incidentally, in general, the change speed of the supercharging pressure with the change in the operation state of the vane is comparatively slow, but the change amount of the supercharging pressure which may be changed by changing the operation state of the vane is comparatively large. For this reason, the change speed of the EGR gas amount with the change in the operation state of the vane is comparatively slow, but the change amount of the EGR gas amount which may be changed by changing the operation state of the vane is comparatively large. Accordingly, when the supercharging pressure deviation changes comparatively slowly and the supercharging pressure deviation is comparatively large or when the EGR ratio deviation changes comparatively slowly and the EGR ratio deviation is comparatively large, it is advantageous that the operation state of the vane is changed so that the supercharging pressure or the EGR ratio is controlled at the target supercharging pressure or the target EGR ratio from the viewpoint of controlling the supercharging pressure or the EGR ratio at the target supercharging pressure or the target EGR ratio with sufficient followability.

Meanwhile, in general, the change speed of the EGR gas amount with the change in the operation state of the EGR control valve is comparatively fast, but the change amount of the EGR gas amount which may be changed by changing the operation state of the EGR control valve is comparatively small. For this reason, the change speed of the supercharging pressure with the change in the operation state of the EGR control valve is comparatively fast, but the change amount of the supercharging pressure which may be changed by changing the operation state of the EGR control valve is comparatively small. Accordingly, when the EGR ratio deviation changes comparatively fast and the EGR ratio deviation is comparatively small or when the supercharging pressure deviation changes comparatively fast and the supercharging pressure deviation is comparatively small, it is advantageous that the operation state of the EGR control valve is changed so that the EGR ratio or the supercharging pressure is controlled at the target EGR ratio or the target supercharging pressure from the viewpoint of controlling the EGR ratio or the supercharging pressure at the target EGR ratio or the target supercharging pressure with sufficient followability.

However, in actual, the supercharging pressure deviation includes the component of the supercharging pressure deviation changing comparatively slowly and the component of the supercharging pressure deviation changing comparatively fast in many cases. For this reason, even when the operation state of the vane is just changed (or the operation state of the EGR control valve is just changed) so that the supercharging pressure is controlled at the target supercharging pressure, it is difficult to control the supercharging pressure at the target supercharging pressure with sufficient followability. Of course, the EGR ratio deviation includes the component of the EGR ratio deviation changing comparatively slowly and the component of the EGR ratio deviation changing comparatively fast in many cases. For this reason, even when the operation state of the EGR control valve is just changed (or the operation state of the vane is just changed) so that the EGR ratio is controlled at the target EGR ratio, it is difficult to control the EGR ratio at the target EGR ratio with sufficient followability.

In this way, there is a limitation in the supercharging pressure deviation or the EGR ratio deviation sufficiently handled by the vane and there is also a limitation in the EGR ratio deviation or the supercharging pressure deviation sufficiently handled by the EGR control valve. However, in the control device disclosed in Patent Document 1, the operation state of the vane and the operation state of the EGR control valve are changed so that the supercharging pressure and the EGR ratio are controlled at the target supercharging pressure and the target EGR ratio without considering the limitation in the deviations sufficiently handled by the vane and the EGR control valve. For this reason, in the control device disclosed in Patent Document 1, it is difficult to control the supercharging pressure and the EGR ratio at the target supercharging pressure and the target EGR ratio with sufficient followability.

Further, the same applies to the control device for an internal combustion engine which includes two control subjects capable of respectively controlling two different control amounts influencing each other, where one control subject may control the control amount at the comparatively low frequency and the other control subject may control the control amount at the comparatively high frequency. That is, there is a limitation in the deviation of the control amount sufficiently handled by one control subject capable of controlling the control amount at the comparatively low frequency and there is also limitation in the deviation of the control amount sufficiently handled by the other control subject capable of controlling the control amount at the comparatively high frequency. Further, even when the operation state of each control subject is changed so that each control amount is controlled at each target control amount without considering the limitation in the deviation of the control amount sufficiently handled by each control subject, in other words, without considering the characteristics of each control subject, it is difficult to control each control amount at each target control amount with sufficient followability.

Therefore, it is an object of the present invention to control each control amount at each corresponding target control amount with sufficient followability in a case where a plurality of control subjects capable of respectively controlling a plurality of different control amounts influencing each other are provided and each control amount is controlled at each corresponding target control amount.

Means for Solving Problems

According to a first invention of the present application, there is provided a control device for an internal combustion engine including: a first control subject capable of controlling a first control amount as one of two different control amounts influencing each other at a frequency lower than a predetermined frequency; and a second control subject capable of controlling a second control amount as the other of the control amounts at a frequency equal to or higher than a predetermined frequency.

Further, in the present invention, the second control amount is changed by changing an operation state of the first control subject so as to change the first control amount, and the first control amount is changed by changing an operation state of the second control subject so as to change the second control amount. Further, in the present invention, the first control amount is controlled at a first target control amount as a target control amount and the second control amount is controlled at a second target control amount as a target control amount by the first control subject and the second control subject.

Here, in the present invention, an operation amount is input to the first control subject so as to change the operation state of the first control subject so that a component of a deviation that changes at a frequency lower than the predetermined frequency of a deviation of the first control amount with respect to the first target control amount and a component of a deviation that changes at a frequency lower than the predetermined frequency of a deviation of the second control amount with respect to the second target control amount become zero or approach zero. Further, in the present invention, an operation amount is input to the second control subject so as to change the operation state of the second control subject so that a component of a deviation that changes at a frequency equal to or higher than the predetermined frequency of the deviation of the first control amount with respect to the first target control amount and a component of a deviation that changes at a frequency equal to or higher than the predetermined frequency of the deviation of the second control amount with respect to the second target control amount become zero or approach zero.

According to the present invention, in the case where the plurality of control subjects capable of respectively controlling a plurality of different control amounts influencing each other are provided and each control amount is controlled at each corresponding target control amount, an effect can be obtained that each control amount may be controlled at each corresponding target control amount with sufficient followability.

That is, for example, in the case where the control amount is controlled at the target control amount by the control subject capable of controlling one specific control amount to be controlled, a so-called feedback control is performed which controls each control amount by the control subject so that a deviation (hereinafter, this deviation is referred to as a "control amount deviation") of the actual control amount with respect to the target control amount becomes zero (that is, the actual control amount becomes the target control amount) based on the control amount deviation.

Here, in general, the control subject capable of settling (that is, zeroing) the control amount deviation changing at a comparatively low frequency at a predetermined speed (here, this speed is a comparatively high speed and a speed required as a control speed of the control amount for obtaining desired characteristics in the internal combustion engine) may not settle the control amount deviation changing at a comparatively high frequency at a predetermined speed in many cases. On the contrary, the control subject capable of settling the control amount deviation changing at a comparatively high frequency at a predetermined speed may not settle the control amount deviation changing at a comparatively low frequency at a predetermined speed in many cases.

Accordingly, in the case of the control subject capable of settling the control amount deviation changing at a comparatively low frequency at a predetermined speed, when the control amount deviation changes at a comparatively high frequency, the control subject may not control the actual control amount at the target control amount so as to follow the predetermined target control amount. Meanwhile, in the case of the control subject capable of settling the control amount deviation changing at a comparatively high frequency at a predetermined speed, when the control amount deviation changes at a comparatively low frequency, the control subject may not control the actual control amount at the target control amount so as to follow the predetermined target control amount.

Further, the control amount deviation may simultaneously include the component of the control amount deviation changing at a comparatively low frequency and the component of the control amount deviation changing at a comparatively high frequency in many cases.

Accordingly, in the case of the control subject capable of settling the control amount deviation changing at a comparatively low frequency at a predetermined speed, the component of the control amount deviation changing at a comparatively low frequency may be settled by the control subject, but the component of the control amount deviation changing at a comparatively high frequency may not be settled by the control subject. That is, in this case, the component of the control amount deviation changing at a comparatively high frequency is not settled, but is left by all means. Meanwhile, in the case of the control subject capable of settling the control amount deviation changing at a comparatively high frequency at a predetermined speed, the component of the control amount deviation changing at a comparatively high frequency may be settled by the control subject, but the component of the control amount deviation changing at a comparatively low frequency may not be settled by the control subject. That is, in this case, the component of the control amount deviation changing at a comparatively low frequency is not settled, but is left by all means.

Here, the first control subject of the control device of the present invention may control the first control amount at a frequency lower than a predetermined frequency. Further, since the second control amount changes by changing the first control amount using the first control subject, the first control subject may consequently control the second control amount at a frequency lower than a predetermined frequency. Further, in the control device of the present invention, the operation amount is input to the first control subject so as to change the operation state of the first control subject so that the first control amount and the second control amount respectively change to the first target control amount and the second target control amount based on the deviation changing at a frequency lower than a predetermined frequency in the deviation of the first control amount with respect to the first target control amount and the deviation changing at a frequency lower than a predetermined frequency in the deviation of the second control amount with respect to the second target control amount. Accordingly, the component of the deviation changing at a comparatively low frequency in the deviation of the first control amount with respect to the first target control amount and the component of the deviation changing at a comparatively low frequency in the deviation of the second control amount with respect to the second target control amount are settled by the first control subject.

Further, the second control subject of the control device of the present invention may control the second control amount at a frequency equal to or higher than a predetermined frequency. Further, since the first control amount changes by changing the second control amount using the second control subject, the second control subject may consequently control the first control amount at a frequency equal to or higher than a predetermined frequency. Further, in the control device of the present invention, the operation amount is input to the second control subject so as to change the operation state of the second control subject so that the first control amount and the second control amount respectively change to the first target control amount and the second target control amount based on the deviation changing at a frequency equal to or higher than a predetermined frequency in the deviation of the first control amount with respect to the first target control amount and the deviation changing at a frequency equal to or higher than a predetermined frequency in the deviation of the second control amount with respect to the second target control amount. Accordingly, the component of the deviation changing at a comparatively high frequency in the deviation of the first control amount with respect to the first target control amount and the component of the deviation changing at a comparatively high frequency in the deviation of the second control amount with respect to the second target control amount are settled by the second control subject.

In this way, in the present invention, the component of the deviation changing at a comparatively low frequency and the component of the deviation changing at a comparatively high frequency in the deviation of the first control amount with respect to the first target control amount are also settled, and the component of the deviation changing at a comparatively low frequency and the component of the deviation changing at a comparatively high frequency in the deviation of the second control amount with respect to the second target control amount are also settled.

Therefore, according to the present invention, an effect can be obtained that each control amount may be controlled at each corresponding target control amount with sufficient followability.

Further, according to a second invention of the present application, in the aforementioned first invention, the internal combustion engine includes a supercharger which increases a pressure of a gas suctioned into a combustion chamber and an exhaust gas recirculation device which introduces an exhaust gas, discharged from the combustion chamber to an exhaust passage, into an intake passage and introduces the exhaust gas into the combustion chamber.

Further, in the present invention, the supercharger includes a pressure control means for variably controlling the pressure of the gas suctioned into the combustion chamber and the exhaust gas recirculation device includes an exhaust gas amount control means for variably controlling the amount of the exhaust gas introduced into the intake passage. Further, the first control subject is the pressure control means of the supercharger, the second control subject is the exhaust gas amount control means of the exhaust gas recirculation device, the first control amount is the pressure of the gas suctioned into the combustion chamber, and the second control amount is the amount of the exhaust gas introduced into the intake passage.

According to the present invention, even in the case where the control amounts influencing each other, that is, the pressure of the gas suctioned into the combustion chamber and the amount of the exhaust gas introduced into the intake passage are controlled at the respectively corresponding target control amounts by the pressure control means of the supercharger and the exhaust gas amount control means of the exhaust gas recirculation device, an effect can be obtained that each control amount may be controlled at each corresponding target control amount with sufficient followability due to the reason described in the effect of the first invention.

Further, according to a third invention of the present application, in the aforementioned first invention, the internal combustion engine includes a supercharger which increases a pressure of a gas suctioned into a combustion chamber, an exhaust gas recirculation device which introduces an exhaust gas, discharged from the combustion chamber to an exhaust passage, into an intake passage and introduces the exhaust gas into the combustion chamber, and a throttle valve which controls the amount of the gas suctioned into the combustion chamber.

Further, in the present invention, the supercharger includes a pressure control means for variably controlling the pressure of the gas suctioned into the combustion chamber. Further, the first control subject is the pressure control means of the supercharger, the second control subject is the throttle valve, the first control amount is the pressure of the gas suctioned into the combustion chamber, and the second control amount is the amount of the exhaust gas suctioned into the intake passage.

According to the present invention, even in the case where the control amounts influencing each other, that is, the pressure of the gas suctioned into the combustion chamber and the amount of the exhaust gas introduced into the intake passage are controlled at each corresponding target control amount by the throttle valve and the pressure control means of the supercharger, an effect can be obtained that each control amount may be controlled at each corresponding target control amount with sufficient followability due to the reason described in the effect of the first invention.

Further, according to a fourth invention of the present application, in the aforementioned first invention, the internal combustion engine includes a supercharger which increases a pressure of a gas suctioned into a combustion chamber, an exhaust gas recirculation device which introduces an exhaust gas, discharged from the combustion chamber to an exhaust passage, into an intake passage and introduces the exhaust gas into the combustion chamber, and a throttle valve which controls the amount of the gas suctioned into the combustion chamber.

Further, in the present invention, the supercharger includes a pressure control means for variably controlling the pressure of the gas suctioned into the combustion chamber and the exhaust gas recirculation device includes an exhaust gas amount control means for variably controlling the amount of the exhaust gas introduced into the intake passage. Further, the first control subject is the pressure control means of the supercharger, the second control subject is the exhaust gas amount control means of the exhaust gas recirculation device and the throttle valve, the first control amount is the pressure of the gas suctioned into the combustion chamber, and the second control amount is the amount of the exhaust gas introduced into the intake passage.

According to the present invention, even in the case where the control amounts influencing each other, that is, the pressure of the gas suctioned into the combustion chamber and the amount of the exhaust gas introduced into the intake passage are controlled at each corresponding target control amount by the pressure control means of the supercharger, the exhaust gas amount control means of the exhaust gas recirculation device and the throttle valve, an effect can be obtained that each control amount may be controlled at each corresponding target control amount with sufficient followability due to the reason described in the effect of the first invention.

Further, according to the present invention, an effect can be obtained that each control amount may be further reliably controlled at each corresponding target control amount with sufficient followability.

That is, the internal combustion engine includes three control subjects (that is, the pressure control means of the supercharger, the exhaust gas amount control means of the exhaust gas recirculation device and the throttle valve) controlling two control amounts (that is, the pressure of the gas suctioned into the combustion chamber and the amount of the exhaust gas introduced into the intake passage) influencing each other. In a case where all control amounts change with a change in the operation state of each control subject (in other words, all control amounts change by changing the operation state of any one control subject), when a change amount (hereinafter, this change amount is referred to as a "target change amount") of the operation state of the control subject for simultaneously causing the deviation of the first control amount and the deviation of the second control amount to become zero is determined, three target change amounts are determined based on a deviation between two control amounts. That is, three target change amounts as the target change amount of the operation state of the pressure control means, the change amount of the operation state of the exhaust gas amount control means, and the change amount of the operation state of the throttle valve are determined based on a deviation between such two control amounts as the first control amount deviation and the second control amount deviation. However, when the number of the control amount deviation as the basis for determining the target change amount is smaller than the number of the control subjects in this way, a plurality of combinations are calculated by the combination of the target change amounts capable of causing each control amount deviation to become zero. In this case, there is a need to determine which combination is optimal. However, there is a case in which it is difficult to determine which combination is optimal, and in this case, it is difficult to calculate the target change amount. Further, even when it is possible to determine which combination is optimal, the target change amount calculation load increases as much as the determination on the optimal combination and a long time is required for the calculation of the target change amount. In this case, each control amount control speed becomes slow.

Meanwhile, in the present invention, the group (that is, the group including the pressure control means of the supercharger) including one control subject and the group (that is, the group including the exhaust gas amount control means of the exhaust gas recirculation device and the throttle valve) including two control subjects may be formed. Further, during the operation of the internal combustion engine, the component of the first control amount deviation and the component of the second control amount deviation corresponding to a frequency (that is, a frequency lower than a predetermined frequency) which may be controlled by the pressure control means of the supercharger grouped as one group are extracted, and the component of the first control amount deviation and the component of the second control amount deviation corresponding to a frequency (that is, a frequency equal to or higher than a predetermined frequency) which may be controlled by the exhaust gas amount control means of the exhaust gas recirculation device and the throttle valve grouped as the other group are extracted. That is, in this way, the component of a deviation between two control amounts is extracted as the control amount deviation component from one control amount deviation. Further, the operation state of each control subject is controlled so that the extracted control amount deviation components become zero by the control subject of the group corresponding to a frequency corresponding to each control amount deviation component.

That is, regarding the group including the pressure control means of the supercharger, the target change amount of the operation state of one control subject as the target change amount of the operation state of the pressure control means is determined based on the component of a deviation between two control amounts as the component of the first control amount deviation of a frequency lower than a predetermined frequency and the component of the second control amount deviation. In other words, the number of the control amount deviation components as the basis of determining the target change amount of the operation state of the pressure control means is larger than the number of the control subjects (that is, the pressure control means) used to compensate (that is, zero) the control amount deviation component. In this case, since the calculation of the plurality of target change amounts as the target change amount of the operation state of the pressure control means is suppressed, there is no need to determine which target change amount is optimal.

Meanwhile, regarding the group including the exhaust gas amount control means of the exhaust gas recirculation device and the throttle valve, the target change amounts of the operation states of two control subjects as the target change amount of the operation state of the exhaust gas amount control means and the target change amount of the operation state of the throttle valve are determined based on the component of a deviation between two control amounts as the component of the first control amount deviation and the component of the second control amount deviation at a frequency equal to or higher than a predetermined frequency. In other words, the number of the control amount deviation components as the basis of determining the target change amount of the operation state of the exhaust gas amount control means and the target change amount of the operation state of the throttle valve is equal to the number of the control subjects (that is, the exhaust gas amount control means and the throttle valve) used to compensate (that is, zero) the control amount deviation component. In this case, since the calculation of the plurality of combinations as the combination of the target change amount of the operation state of the exhaust gas amount control means and the target change amount of the operation state of the throttle valve is suppressed, there is no need to determine which target change amount is optimal.

Therefore, according to the present invention, an effect can be obtained that each control amount may be further reliably controlled at each corresponding target control amount with sufficient followability.

Further, according to the fifth invention of the present application, there is provided a control device for an internal combustion engine including: a plurality of control subjects controlling a plurality of control amounts influencing each other, in which all control amounts change with a change in the operation state of each control subject, and the operation state of each control subject is controlled so that each control amount is controlled at each corresponding target control amount.

Further, in the present invention, when a deviation of an actual control amount with respect to each corresponding target control amount is denoted by a control amount deviation, a plurality of frequency ranges for grouping each control subject based on a frequency of the control amount deviation in which each control subject is able to be controlled at a predetermined speed and for grouping the control subjects equal to or smaller than the total number of the control amounts in one group when grouping each control subject for each frequency range based on the frequency of the control amount deviation in which each control subject is able to be controlled at a predetermined speed is set. Further, in the present invention, a component corresponding to each frequency range is extracted as a control amount deviation component from each control amount deviation during an operation of the internal combustion engine. Further, in the present invention, the operation state of each control subject is controlled so that the extracted control amount deviation component becomes zero by the control subject of the group corresponding to a frequency range corresponding to each control amount deviation component.

According to the present invention, in the case where the plurality of control subjects capable of respectively controlling the plurality of different control amounts influencing each other are provided and each control amount is controlled at each corresponding target control amount, that is, there is a need to execute the control of the operation state of each control subject in cooperation with each other so that each control amount is controlled at each corresponding target control amount due to the control amounts influencing each other, an effect can be obtained that each control amount may be controlled at each corresponding target control amount with sufficient followability.

That is, for example, in the case where the internal combustion engine includes three control subjects controlling two control amounts influencing each other and all control amounts change with a change in the operation state of each control subject (in other words, all control amounts change by changing the operation state of any one control subject), when a change amount (hereinafter, this change amount is referred to as a "target change amount") of the operation state of the control subject for simultaneously causing the deviations (that is, the control amount deviations) of the control amounts with respect to each corresponding target control amount to become zero is determined, three target change amounts are determined based on a deviation between two control amounts. However, in this way, when the number of the control amount deviations as the basis of determining the target change amount is smaller than the number of the control subjects, a plurality of combinations may be calculated as the combination of the target change amounts capable of causing each control amount deviation to become zero. In this case, there is a need to determine which combination is optimal. However, there is a case in which it is difficult to determine which combination is optimal, and in this case, it is difficult to calculate the target change amount. Further, even when it is possible to determine which combination is optimal, the target change amount calculation load increases as much as the determination on the optimal combination and a long time is required for the calculation of the target change amount. In this case, each control amount control speed becomes slow.

Meanwhile, in the present invention, in the case where the internal combustion engine includes three control subjects controlling two control amounts influencing each other and all control amounts change with a change in the operation state of each control subject, for example, two frequency ranges (that is, two frequency ranges capable of forming at least two groups) capable of forming the group including one control subject and the group including two control subjects are set. Further, during the operation of the internal combustion engine, the component of each control amount deviation corresponding to each frequency range is extracted as the control amount deviation component. That is, in this way, the component of a deviation between two control amounts is extracted from one control amount deviation. Further, the operation state of each control subject is controlled so that the extracted control amount deviation components become zero by the control subjects of the group corresponding to a frequency range corresponding to each control amount deviation component.

That is, regarding the group including one control subject, the target change amount of the operation state of one control subject is determined based on the component of a deviation between two control amounts. In other words, the number of the control amount deviation components as the basis of determining the target change amount is larger than the number of the control subjects used to compensate (that is, zero) the control amount deviation component. In this case, since the calculation of the plurality of target change amounts as the target change amount is suppressed, there is no need to determine which target change amount is optimal.

Meanwhile, regarding the group including two control subjects, the target change amounts of the operation states of two control subjects are determined based on the component of a deviation between two control amounts. In other words, the number of the control amount deviation components as the basis of determining the target change amount is equal to the number of the control subjects used to compensate (that is, zero) the control amount deviation component. In this case, since the calculation of the plurality of combinations as the combination of the target change amounts is suppressed, there is no need to determine which target change amount is optimal.

Therefore, according to the present invention, an effect can be obtained that each control amount may be controlled at each corresponding target control amount with sufficient followability.

Further, according to a sixth invention of the present application, in the fifth invention, the internal combustion engine includes a supercharger which increases a pressure of a gas suctioned into a combustion chamber, an exhaust gas recirculation device which introduces an exhaust gas, discharged from the combustion chamber to an exhaust passage, into an intake passage and introduces the exhaust gas into the combustion chamber, and a throttle valve which controls the amount of the gas suctioned into the combustion chamber.

Further, in the present invention, the supercharger includes a pressure control means for variably controlling the pressure of the gas suctioned into the combustion chamber and the exhaust gas recirculation device includes an exhaust gas amount control means for variably controlling the amount of the exhaust gas introduced into the intake passage. Further, as the group, a group including the pressure control means of the supercharger and a group including the exhaust gas amount control means of the exhaust gas recirculation device and the throttle valve are formed. Further, the plurality of control amounts are the pressure of the gas suctioned into the combustion chamber and the amount of the exhaust gas introduced into the intake passage.

According to the present invention, even in the case where the control amounts influencing each other, that is, the pressure of the gas suctioned into the combustion chamber and the amount of the exhaust gas introduced into the intake passage are controlled at each corresponding target control amount by the pressure control means of the supercharger, the exhaust gas amount control means of the exhaust gas recirculation device and the throttle valve, an effect can be obtained that each control amount may be controlled at each corresponding target control amount with sufficient followability due to the same reason described in the effect of the fifth invention.

DETAILED DESCRIPTION OF THE INVENTION

Figure 1:
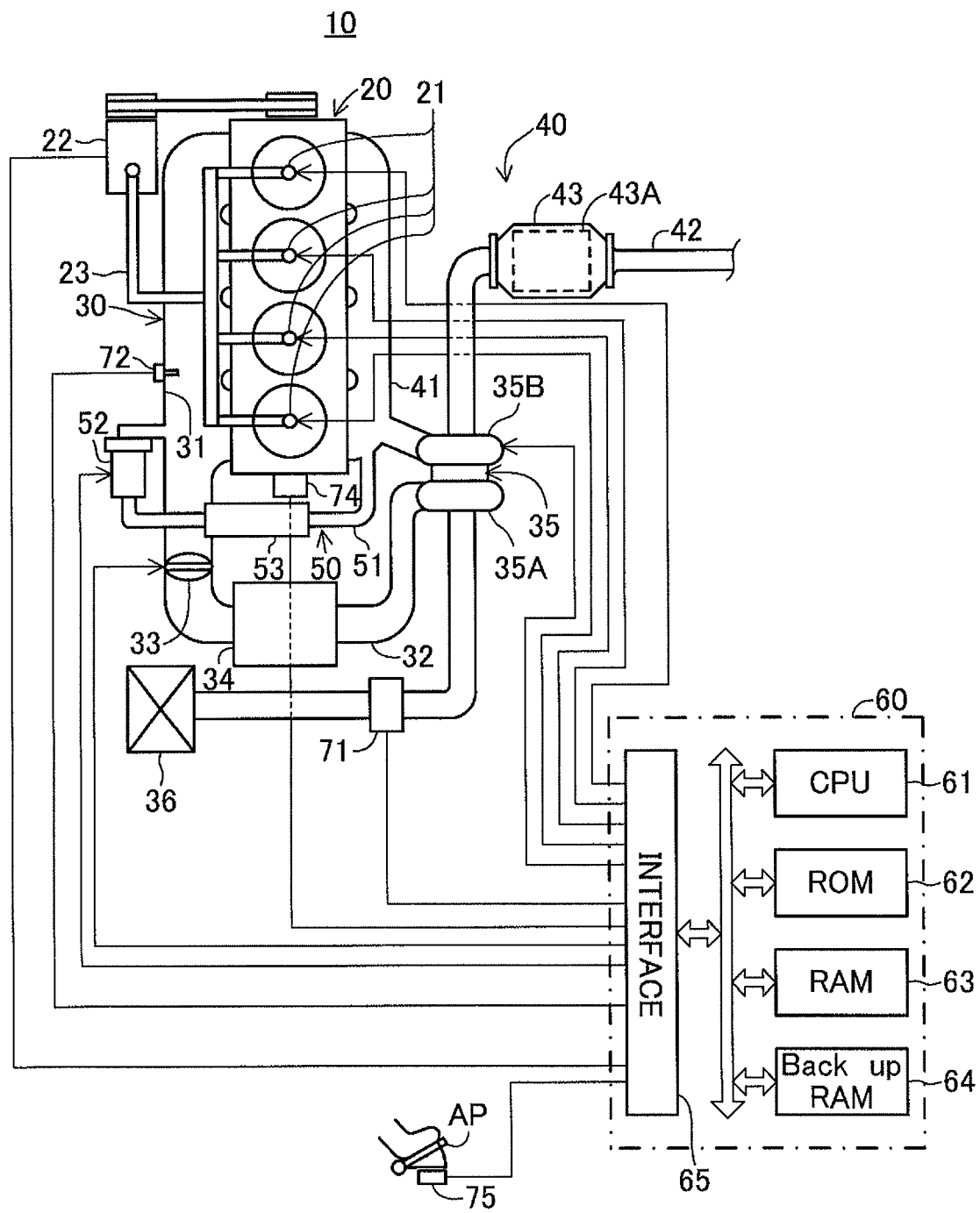
FIG. 1 is an entire diagram of an internal combustion engine which adopts a control device of the present invention.

Hereinafter, embodiments of the present invention will be described by referring to the drawings. FIG. 1 shows an internal combustion engine 10 which adopts a control device of the present invention. The internal combustion engine 10 includes a body (hereinafter, referred to as an "engine body") 20 of the internal combustion engine, a fuel injection valve 21 which is disposed so as to correspond to each of four combustion chambers of the engine body, and a fuel pump 22 which supplies fuel to the fuel injection valve 21 through a fuel supply pipe 23. Further, the internal combustion engine 10 includes an intake system 30 which supplies air from the outside to the combustion chamber and an exhaust system 40 which discharges an exhaust gas discharged from the combustion chamber to the outside. Further, the internal combustion engine 10 is a compression self ignition type internal combustion engine (a so-called diesel engine).

The intake system 30 includes an intake branch pipe 31 and an intake pipe 32. Furthermore, in the description below, the intake system 30 is referred to as an "intake passage". One end (specifically, a branch portion) of the intake branch pipe 31 is connected to an intake port (not shown) which is formed inside the engine body 20 so as to correspond to each combustion chamber. Meanwhile, the other end of the intake branch pipe 31 is connected to the intake pipe 32. The intake pipe 32 has a throttle valve 33 which is disposed therein so as to control the amount of air flowing inside the intake pipe. Further, the intake pipe 32 has an intercooler 34 which is disposed therein so as to cool air flowing inside the intake pipe. Further, an air cleaner 36 is disposed at the end of the intake pipe 32 which faces the outside.

Furthermore, the throttle valve 33 may variably control the amount of the gas which is suctioned into the combustion chamber by controlling the operation state (specifically, this is an opening degree and, hereinafter, is referred to as a "throttle valve opening degree").

Meanwhile, the exhaust system 40 includes an exhaust branch pipe 41 and an exhaust pipe 42. Furthermore, in the description below, the exhaust system 40 is referred to as an "exhaust passage". One end (that is, the branch portion) of the exhaust branch pipe 41 is connected to an exhaust port (not shown) which is formed inside the engine body 20 so as to correspond to each combustion chamber. Meanwhile, the other end of the exhaust branch pipe 41 is connected to the exhaust pipe 42. The exhaust pipe 42 has a catalyst converter 43 disposed therein which incorporates an exhaust purifying catalyst 43A for purifying a specific component in the exhaust gas.

Figure 2:
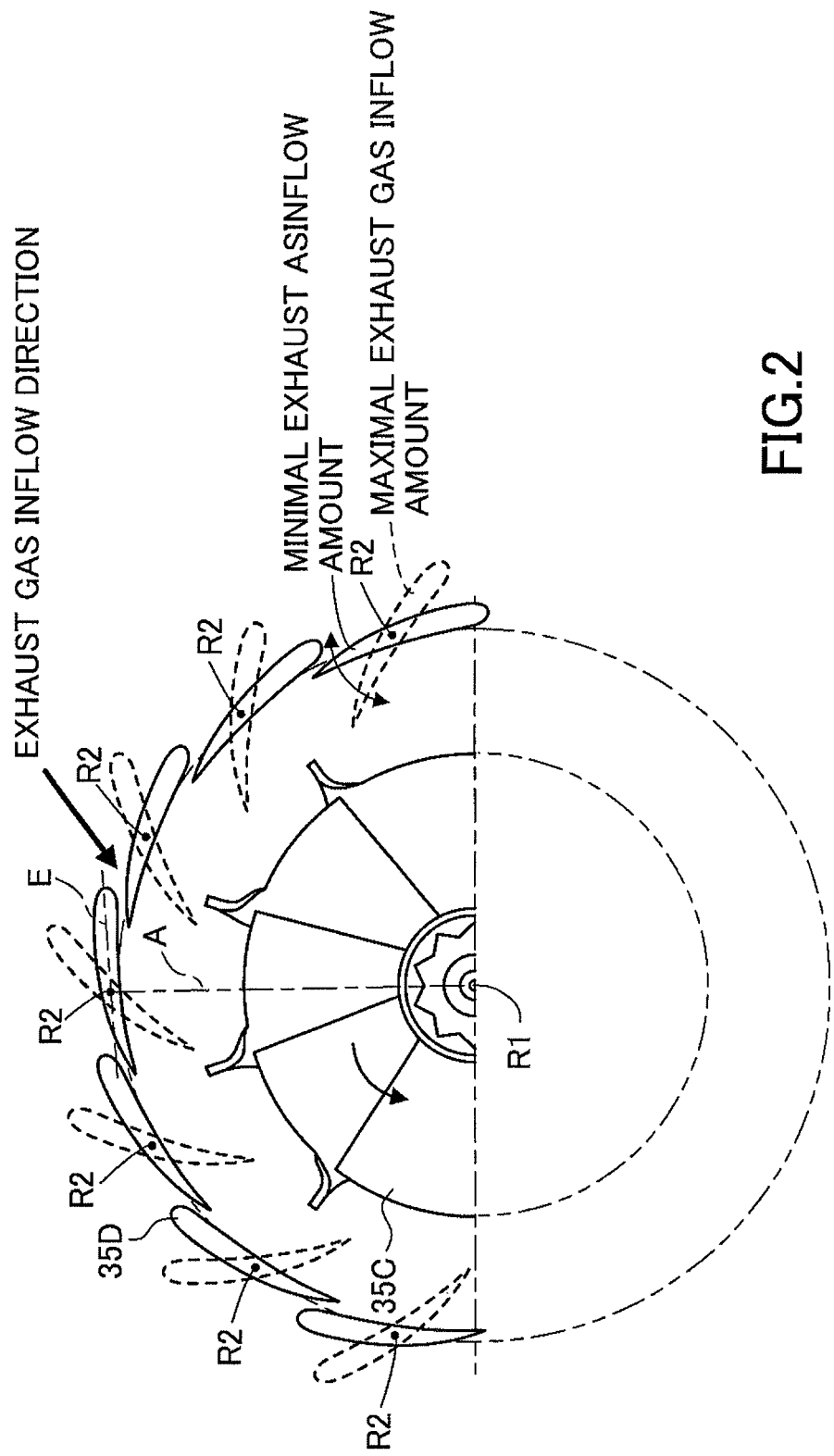
FIG. 2 is a diagram showing an exhaust turbine of a supercharger of the internal combustion engine shown in FIG. 1.

Further, the internal combustion engine 10 includes a supercharger 35. The supercharger 35 includes a compressor 35A which is disposed inside the intake pipe 32 at the upstream side of the intercooler 34 and an exhaust turbine 35B which is disposed inside the exhaust pipe 42 at the upstream side of the catalyst converter 43. As shown in FIG. 2, the exhaust turbine 35B includes an exhaust turbine body 35C and a plurality of wing-like vanes 35D.

The exhaust turbine 35B (precisely, the exhaust turbine body 35C) is connected to the compressor 35A through a shaft (not shown). When the exhaust turbine body 35C is rotated by the exhaust gas, the rotation is transmitted to the compressor 35A through the shaft, so that the compressor 35A is rotated. The gas inside the intake pipe 32 at the downstream side of the compressor is compressed by the rotation of the compressor 35A, so that the pressure of the gas (hereinafter, this pressure is referred to as a "supercharging pressure") is increased.

Meanwhile, the vanes 35D are arranged at the same angular interval in a radial shape about a rotation center axis R1 of the exhaust turbine body so as to surround the exhaust turbine body 35C. Further, each vane 35D is disposed so as to be rotatable about each corresponding axis indicated by the reference sign R2 of FIG. 2. Further, when a direction in which each vane 35D is extended (that is, a direction indicated by the reference sign E of FIG. 2) is referred to as an "extension direction" and a line (that is, a line indicated by the reference sign A of FIG. 2) connecting the rotation center axis R1 of the exhaust turbine body 35C to the rotation axis R2 of the vane 35D is referred to as a "reference line", each vane 35D may rotate so that the angle formed between the extension direction E and the reference line A corresponding thereto is the same for all vanes 35D. Further, when each vane 35D is rotated so that the angle formed between the extension direction E and the reference line A corresponding thereto decreases, that is, the passage area between the adjacent vanes 35D decreases, the pressure (hereinafter, this pressure is referred to as an "exhaust pressure") inside the exhaust passage 40 at the upstream side of the exhaust turbine body 35C increases, so that the flow rate of the exhaust gas supplied to the exhaust turbine body 35C increases. For this reason, the rotation speed of the exhaust turbine body 35C is increased, so that the rotation speed of the compressor 35A is also increased. Accordingly, a gas which flows inside the intake pipe 32 is largely compressed by the compressor 35A. For this reason, a degree in which the gas flowing inside the intake pipe 32 is compressed by the compressor 35A becomes larger (that is, the supercharging pressure becomes higher) as the angle (hereinafter, this angle is referred to as a "vane opening degree") which is formed between the extension direction E of each vane 35D and the reference line corresponding thereto becomes smaller.

Accordingly, the supercharger 35 may variably control the supercharging pressure by controlling the operation state (specifically, the vane opening degree) of the vane 35D.

Further, the internal combustion engine 10 includes an exhaust gas recirculation device (hereinafter, this is referred to as an "EGR device") 50. The EGR device 50 includes an exhaust gas recirculation pipe (hereinafter, this is referred to as an "EGR passage") 51. One end of the EGR passage 51 is connected to the exhaust branch pipe 41. That is, one end of the EGR passage 51 is connected to a portion of the exhaust passage 40 at the upstream side of the exhaust turbine 35B. Meanwhile, the other end of the EGR passage 51 is connected to the intake branch pipe 31. That is, the other end of the EGR passage 51 is connected to a portion of the intake passage at the downstream side of the compressor 35A. Further, in the EGR passage 51, an exhaust gas recirculation control valve (hereinafter, this exhaust gas recirculation control valve is referred to as an "EGR control valve") 52 is disposed to control the flow rate of the exhaust gas flowing inside the EGR passage. In the internal combustion engine 10, the flow rate of the exhaust gas flowing inside the EGR passage 51 becomes larger as the opening degree (hereinafter, this opening degree is referred to as an "EGR control valve opening degree") of the EGR control valve 52 is increased. Further, in the EGR passage 51, an exhaust gas recirculation cooler 53 is disposed to cool the exhaust gas flowing inside the EGR passage.

Furthermore, the EGR device 50 may variably control the amount of the exhaust gas (hereinafter, this exhaust gas is referred to as an "EGR gas") introduced into the intake passage 30 through the EGR passage 51 by controlling the operation state (specifically, this is the opening degree of the EGR control valve 52 and hereinafter, this opening degree is referred to as the "EGR control valve opening degree") of the EGR control valve 52.

Further, an air flow meter 71 which detects the flow rate of air flowing inside the intake pipe is attached to the intake pipe 32 which is disposed at the downstream side of the air cleaner 36 and is disposed at the upstream side of the compressor 35A. Further, a pressure sensor (hereinafter, referred to as a "supercharging pressure sensor") 72 which detects the pressure (that is, the supercharging pressure) of the gas in the intake branch pipe is attached to the intake branch pipe 31. Further, a crank position sensor 74 which detects the rotation phase of the crank shaft is attached to the engine body 20.

Further, the internal combustion engine 10 includes an electronic control device 60. The electronic control device 60 includes a microprocessor (CPU) 61, a read only memory (ROM) 62, a random access memory (RAM) 63, a backup RAM (Back up RAM) 64, and an interface 65. The interface 65 is connected with the fuel injection valve 21, the fuel pump 22, the throttle valve 33, the vane 35D, and the EGR control valve 52, and a control signal for controlling the operation thereof is applied thereto from the electronic control device 60 through the interface 65. Further, the interface 65 is also connected with the air flow meter 71, the supercharging pressure sensor 72, the crank position sensor 74, and an accelerator pedal opening degree sensor 75 which detects the opening degree of the accelerator pedal AP (that is, the stepping amount of the accelerator pedal AP and hereinafter, this is referred to as an "accelerator pedal opening degree"), and a signal corresponding to the flow rate detected by the air flow meter 71, a signal corresponding to the pressure detected by the supercharging pressure sensor 72, a signal corresponding to the rotation phase of the crank shaft detected by the crank position sensor 74, and a signal corresponding to the stepping amount of the accelerator pedal AP detected by the accelerator pedal opening degree sensor 75 are input to the interface 65.

Furthermore, the supercharging pressure is calculated by the electronic control device 60 based on the signal corresponding to the pressure detected by the supercharging pressure sensor 72, the engine rotation speed (that is, the rotation speed of the internal combustion engine 10) is calculated by the electronic control device 60 based on the signal corresponding to the rotation phase of the crank shaft detected by the crank position sensor 74, and the accelerator pedal opening degree is calculated by the electronic control device 60 based on the signal corresponding to the stepping amount of the accelerator pedal AP detected by the accelerator pedal opening degree sensor 75.

Incidentally, in this embodiment (hereinafter, referred to as the "first embodiment"), an actual supercharging pressure (hereinafter, this supercharging pressure is referred to as an "actual supercharging pressure") is controlled at a target value (hereinafter, this target value is referred to as a "target supercharging pressure") of the supercharging pressure set as described below. Further, when a ratio of the amount of the EGR gas contained in the gas with respect to the amount of the gas suctioned into the combustion chamber is referred to as an "EGR ratio", in this embodiment, an actual EGR ratio (hereinafter, this EGR ratio is referred to as an "actual EGR ratio") is controlled at a target value (hereinafter, this target value is referred to as a "target EGR ratio") of the EGR ratio set as described below.

Next, a setting of the target supercharging pressure and the target EGR ratio according to the first embodiment will be described. Furthermore, in the description below, an "engine operation state" is an "operation state of the internal combustion engine 10", an "engine load" is a "load of the internal combustion engine 10", an "engine rotation speed" is a "rotation speed of the internal combustion engine 10", and a "state during the engine operation" is a "state during the operation of internal combustion engine 10".

Figure 3:
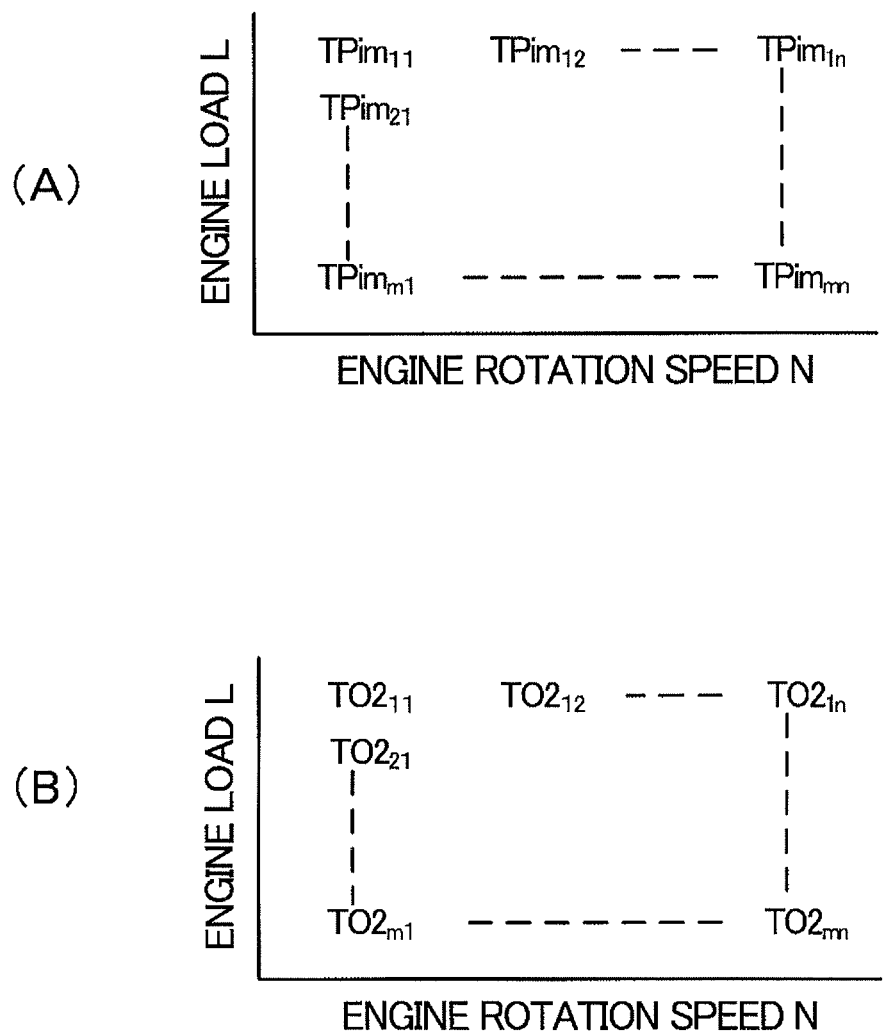
FIG. 3(A) is a diagram showing a map which is used to set a target supercharging pressure based on an engine rotation speed and an engine load.
FIG. 3(B) is a diagram showing a map which is used to set a target oxygen concentration based on the engine rotation speed and the engine load.

In the first embodiment, the supercharging pressure to be a target is obtained in advance by an experiment or the like, and the supercharging pressure is stored as a target supercharging pressure TPim in the electronic control device 60 in the form of a map of a function between the engine rotation speed N and the engine load L as shown in FIG. 3(A). Further, the target supercharging pressure TPim is acquired from the map of FIG. 3(A) based on the engine rotation speed N and the engine load L during the engine operation.

Further, the oxygen concentration in the suctioned gas to be a target is obtained in advance by an experiment or the like, and the oxygen concentration is stored as a target oxygen concentration TO2 in the electronic control device 60 in the form of a map of a function between the engine rotation speed N and the engine load L as shown in FIG. 3(B). Further, the target oxygen concentration TO2 is acquired from the map of FIG. 3(B) based on the engine rotation speed N and the engine load L during the engine operation.

Further, the EGR ratio in which the actual oxygen concentration (hereinafter, this oxygen concentration is referred to as an "actual oxygen concentration") in the suctioned gas is set as the target oxygen concentration TO2 when controlling the actual supercharging pressure at the target supercharging pressure TPim is calculated as the target EGR ratio. According to another method, the target EGR ratio is calculated (that is, set) based on the target supercharging pressure TPims and the target oxygen concentration TO2.

Next, in order to control the actual supercharging pressure at the target supercharging pressure set as described above and to control the actual EGR ratio at the target EGR ratio set as described above, a setting of the operation amount to be input to the vane (hereinafter, this operation amount is referred to as a "target vane operation amount") and the operation amount to be input to the EGR control valve (hereinafter, this operation amount is referred to as a "target EGR control valve operation amount") will be described.

In the first embodiment, a current actual supercharging pressure (hereinafter, this supercharging pressure is referred to as an "actual supercharging pressure") and a current actual EGR ratio (hereinafter, this EGR ratio is referred to as an "actual EGR ratio") are acquired. Further, a deviation of the acquired actual supercharging pressure with respect to the target supercharging pressure TPim acquired from the map of FIG. 3(A) as described above (hereinafter, this deviation is referred to as a "supercharging pressure deviation") is calculated and a deviation of the actual EGR ratio with respect to the target EGR ratio calculated as described above (hereinafter, this deviation is referred to as an "EGR ratio deviation") is calculated.

Figure 4:
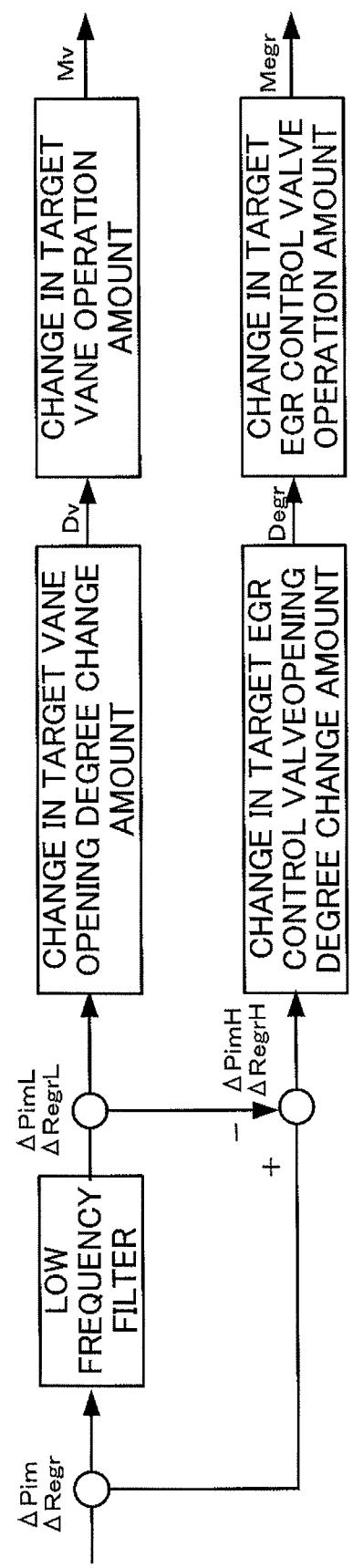
FIG. 4 is a diagram schematically showing a setting of a target vane operation amount and a target EGR control valve operation amount according to a first embodiment of the present invention.

Further, as shown in FIG. 4, a component (hereinafter, this component is referred to as a "low frequency supercharging pressure deviation component") ΔPimL of the supercharging pressure deviation of the frequency lower than a predetermined frequency is extracted from the calculated supercharging pressure deviation ΔPim by a low frequency filter, and a component (hereinafter, this component is referred to as a "low frequency EGR ratio deviation component") ΔRegrL of the EGR ratio deviation of the frequency lower than a predetermined frequency is extracted from the calculated EGR ratio deviation ΔRegr by a low frequency filter. In other words, a component which changes by a comparatively small change rate per unit time in the component of the supercharging pressure deviation included in the calculated supercharging pressure deviation is extracted and a component which changes by a comparatively small change rate per unit time in the component of the EGR ratio deviation included in the calculated EGR ratio deviation is extracted.

Further, as shown in FIG. 4, a component (hereinafter, this component is referred to as a "high frequency supercharging pressure deviation component") ΔPimH of the supercharging pressure deviation of a frequency equal to or higher than a predetermined frequency is extracted by subtracting the extracted low frequency supercharging pressure deviation component ΔPimL from the calculated supercharging pressure deviation ΔPim, and a component (hereinafter, this component is referred to as a "high frequency EGR ratio deviation component") ΔRegrH of the EGR ratio deviation of a frequency equal to or higher than a predetermined frequency is extracted by subtracting the extracted low frequency EGR ratio deviation ΔRegrL from the calculated EGR ratio deviation ΔRegr. In other words, a component which changes by a comparatively large change rate per unit time in the component of the supercharging pressure deviation included in the calculated supercharging pressure deviation is extracted, and a component which changes by a comparatively large change rate per unit time in the component of the EGR ratio deviation included in the calculated EGR ratio deviation is extracted.

Further, as shown in FIG. 4, an amount (hereinafter, this amount is referred to as a "target vane opening degree change amount") Dv to change the current vane opening degree is calculated (that is, the low frequency supercharging pressure deviation component and the low frequency EGR ratio deviation component are converted into the corresponding target vane opening degree change amount) based on the extracted low frequency supercharging pressure deviation component ΔPimL and the extracted low frequency EGR ratio deviation component ΔRegrL so that these components become zero (or approach zero), and an amount (hereinafter, this amount is referred to as a "target EGR control valve opening degree change amount") Degr to change the current EGR control valve opening degree is calculated (specifically, the high frequency supercharging pressure deviation component and the high frequency EGR ratio deviation component are converted into the corresponding target EGR control valve opening degree change amount) based on the extracted high frequency supercharging pressure deviation component ΔPimH and the extracted high frequency EGR ratio deviation component ΔRegrH so that these components become zero (or approach zero).

Further, as shown in FIG. 4, an operation amount Mv to be input to the vane so as to change the current vane opening degree by the calculated target vane opening degree change amount Dv is calculated and the operation amount is set as the target vane operation amount (that is, the target vane opening degree change amount Dv is converted into the target vane operation amount Mv). Further, an operation amount Megr to be input to the EGR control valve so as to change the current EGR control valve opening degree by the calculated target EGR control valve opening degree change amount is calculated and the operation amount is set as the target EGR control valve operation amount (that is, the target EGR control valve opening degree change amount Degr is converted into the target EGR control valve operation amount Megr). In this way, in the first embodiment, the target vane operation amount and the target EGR control valve operation amount are set.

When the target vane operation amount and the target EGR control valve operation amount set in this way are respectively input to the vane and the EGR control valve, the supercharging pressure and the EGR ratio may be respectively controlled at the target supercharging pressure and the target EGR ratio with sufficient followability.

Next, described is the reason why the supercharging pressure and the EGR ratio may be respectively controlled at the target supercharging pressure and the target EGR ratio with sufficient followability by respectively inputting the target vane operation amount and the target EGR control valve operation amount set according to the first embodiment to the vane and the EGR control valve.

When the EGR control valve opening degree increases as described above, the EGR gas amount increases, so that the EGR ratio increases. When the EGR control valve opening degree decreases, the EGR gas amount decreases, so that the EGR ratio decreases. Here, the present inventor's examination proves characteristics that the EGR ratio deviation that changes for a comparatively short time may be compensated (that is, the EGR ratio deviation becomes zero by causing the actual EGR ratio to approach the target EGR ratio) and the comparatively large EGR ratio deviation may be compensated in the control of the EGR gas amount according to a change in the EGR control valve opening degree, that is, the control of the EGR ratio according to a change in the EGR control valve opening degree.

Accordingly, when the target EGR ratio changes so that the EGR ratio deviation changes or when the actual EGR ratio controlled at the target EGR ratio deviates from the target EGR ratio due to any influence so that the EGR ratio deviation occurs, the EGR ratio deviation may be sufficiently compensated by changing the EGR control valve opening degree.

However, as described above, when the vane opening degree changes, the EGR ratio also changes due to a change in the vane opening degree. Further, since the supercharging pressure is controlled by changing the vane opening degree when controlling the EGR ratio by changing the EGR control valve opening degree in actual, even when the EGR control valve operation amount which is set to change the EGR ratio only by changing the EGR control valve opening degree in the event of the EGR ratio deviation is input to the EGR control valve, the EGR ratio deviation is not compensated (that is, the EGR ratio deviation does not become zero) or the EGR ratio deviation is not compensated even at the sufficient speed since the EGR ratio changes due to a change in the vane opening degree. Accordingly, in order to reliably compensate the EGR ratio deviation or compensate the EGR ratio deviation at a sufficient speed, it is preferable to set the EGR control valve operation amount in consideration of a change in the EGR ratio caused by a change in the vane opening degree in the event of the EGR ratio deviation and to input the set EGR control valve operation amount to the EGR control valve.

Here, the present inventor's examination proves characteristics that it is difficult to compensate the supercharging pressure deviation that changes for a comparatively short time at the sufficient speed (that is, it is difficult for the supercharging pressure deviation to become zero by causing the actual supercharging pressure to reach the target supercharging pressure) in the control of the supercharging pressure by a change in the vane opening degree, but a comparatively large supercharging pressure deviation may be compensated. That is, as described above, when the vane opening degree decreases, the exhaust pressure increases, so that the rotation speed of the exhaust turbine increases. Thus, the rotation speed of the compressor increases, so that the supercharging pressure increases. Meanwhile, when the vane opening degree increases, the exhaust pressure decreases, so that the rotation speed of the exhaust turbine decreases. Thus, the rotation speed of the compressor decreases, so that the supercharging pressure decreases. In this way, when the vane opening degree changes, the supercharging pressure changes. Here, according to the present inventor's examination, it is proved that a comparatively long time is required until the supercharging pressure actually starts to change after the vane opening degree changes. For this reason, in the control of the supercharging pressure due to a change in the vane opening degree, there is characteristics that the supercharging pressure deviation that changes for a comparatively short time is not easily compensated at a sufficient speed, but a comparatively large supercharging pressure deviation may be compensated.

Further, since a comparatively long time is required until the supercharging pressure actually starts to change from a time point at which the vane opening degree changes when controlling the supercharging pressure by changing the vane opening degree, a comparatively long time is also required until the EGR ratio starts to change due to a change in the vane opening degree from a time point at which the vane opening degree changes. Accordingly, in order to reliably compensate the EGR ratio deviation or compensate the EGR ratio deviation at the sufficient speed, the EGR control valve operation amount capable of compensating the EGR ratio deviation in consideration of a change in the EGR ratio caused by a change in the vane opening degree in the event of the EGR ratio deviation may be set and the set EGR control valve operation amount may be input to the EGR control valve.

Incidentally, as described above, in the control of the supercharging pressure due to a change in the vane opening degree, there is characteristics that the supercharging pressure deviation that changes for a comparatively short time may not be easily compensated at the sufficient speed. Meanwhile, in the control of the EGR ratio due to a change in the EGR control valve opening degree, there is characteristics that the EGR ratio deviation that changes for a comparatively short time may be compensated at the sufficient speed. Further, as described above, the supercharging pressure changes when the EGR control valve opening degree changes. For this reason, a speed at which the supercharging pressure changes due to a change in the EGR control valve opening degree is comparatively fast. Accordingly, it is possible to compensate the supercharging pressure deviation that changes for a comparatively short time due to a change in the EGR control valve opening degree at the sufficient speed.

That is, when the vane opening degree is not changed, the EGR ratio deviation may be compensated only by a change in the EGR control valve opening degree without considering a change in the EGR ratio caused by a change in the vane opening degree. However, since the vane opening degree is frequently changed in actual in many cases, there is a need to compensate the EGR ratio deviation by changing the EGR control valve opening degree in consideration of a change in the EGR ratio caused by a change in the vane opening degree. Meanwhile, it is difficult to compensate the supercharging pressure deviation that changes for a comparatively short time due to a change in the vane opening degree at the sufficient speed, but the EGR control valve opening degree frequently changes in many cases, so that the supercharging pressure changes in many cases due to a change in the EGR control valve opening degree. Accordingly, since the supercharging pressure deviation that changes for a comparatively short time may be compensated at the sufficient speed by using a change in the supercharging pressure caused by a change in the EGR control valve opening degree, it is advantageous to use a change in the supercharging pressure caused by a change in the EGR control valve opening degree when compensating the supercharging pressure deviation by changing the vane opening degree from the viewpoint of reliably compensating the supercharging pressure deviation.

Here, when the EGR ratio deviation is divided into a component of the EGR ratio deviation that changes for a comparatively short time and a component of the EGR ratio deviation that changes for a comparatively long time, the supercharging pressure deviation is divided into a component of the supercharging pressure deviation that changes for a comparatively short time and a component of the supercharging pressure deviation that changes for a comparatively long time, the component of the EGR ratio deviation that changes for a comparatively short time and the component of the supercharging pressure deviation that changes for a comparatively short time are compensated by changing the EGR control valve opening degree, and the component of the supercharging pressure deviation that changes for a comparatively long time and the component of the EGR ratio deviation that changes for a comparatively long time are compensated by changing the vane opening degree, even when the control of the EGR ratio due to a change in the EGR control valve opening degree and the control of the supercharging pressure due to a change in the vane opening degree interfere with each other, it is possible to reliably compensate the EGR ratio deviation at the sufficient speed and to reliably compensate the supercharging pressure deviation at the sufficient speed using the above-described method.

Here, in the first embodiment, the EGR ratio deviation is divided into the low frequency EGR ratio deviation component (that is, the component of the EGR ratio deviation that changes for a comparatively long time) and the high frequency EGR ratio deviation component (that is, the component of the EGR ratio deviation that changes for a comparatively short time), the supercharging pressure deviation is divided into the low frequency supercharging pressure deviation component (that is, the component of the supercharging pressure deviation that changes for a comparatively long time) and the high frequency supercharging pressure deviation component (that is, the component of the supercharging pressure deviation that changes for a comparatively short time), the high frequency EGR ratio deviation component and the high frequency supercharging pressure deviation component are compensated by changing the EGR control valve opening degree, and the low frequency supercharging pressure deviation component and the low frequency EGR ratio deviation component are compensated by changing the vane opening degree.

Therefore, according to the first embodiment, since the supercharging pressure deviation and the EGR ratio deviation are reliably compensated at the sufficient speed, the supercharging pressure and the EGR ratio may be respectively controlled at the target supercharging pressure and the target EGR ratio with sufficient followability.

Furthermore, in the first embodiment, the predetermined frequency which is used to extract the low frequency supercharging pressure deviation component (furthermore, to extract the high frequency supercharging pressure deviation component) from the supercharging pressure deviation is equal to the predetermined frequency which is used to extract the low frequency EGR ratio deviation component (furthermore, to extract the high frequency EGR ratio deviation) from the EGR ratio deviation. However, when it is preferable to extract an appropriate component as the high frequency supercharging pressure deviation component to be compensated by changing the EGR control valve opening degree from the supercharging pressure deviation or to extract an appropriate component as the low frequency EGR ratio deviation component to be compensated by changing the vane opening degree from the EGR ratio deviation in consideration of the frequency of the component of the supercharging pressure deviation which may be compensated by changing the vane opening degree, the frequency of the component of the EGR ratio deviation which may be compensated by changing the vane opening degree, the frequency of the component of the EGR ratio deviation which may be compensated by changing the EGR control valve opening degree, and the frequency of the component of the supercharging pressure deviation which may be compensated by changing the EGR control valve opening degree, the predetermined frequency which is used to extract the low frequency supercharging pressure deviation component from the supercharging pressure deviation may be different from the predetermined frequency which is used to extract the low frequency EGR ratio deviation component from the EGR ratio deviation.

Further, in the first embodiment, the supercharging pressure deviation is divided into the low frequency supercharging pressure deviation component and the high frequency supercharging pressure deviation component by the low frequency filter, and the EGR ratio deviation is divided into the low frequency EGR ratio deviation component and the high frequency EGR ratio deviation component by the low frequency filter. However, instead of this, the supercharging pressure deviation may be divided into the low frequency supercharging pressure deviation component and the high frequency supercharging pressure deviation component by the high frequency filter and the EGR ratio deviation may be divided into the low frequency EGR ratio deviation component and the high frequency EGR ratio deviation component by the high frequency filter. In this case, the target vane operation amount and the target EGR control valve operation amount may be set as described below.

Figure 5:
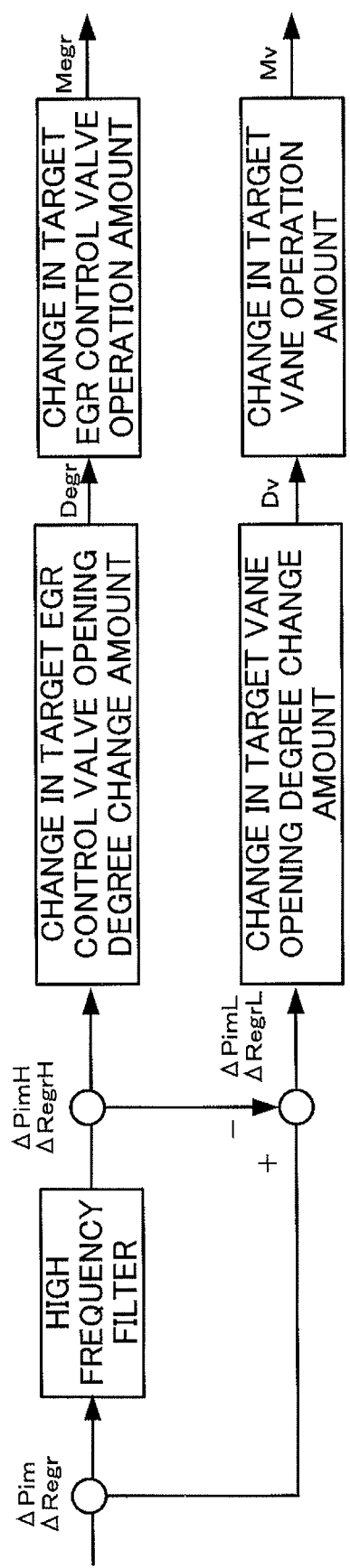
FIG. 5 is a diagram schematically showing a setting of a target vane operation amount and a target EGR control valve operation amount according to another embodiment of the present invention.

That is, in this case, as shown in FIG. 5, a component (hereinafter, this component is referred to as a "high frequency supercharging pressure deviation component") $\Delta$PimH of the supercharging pressure deviation of the frequency higher than a predetermined frequency is extracted from the supercharging pressure deviation $\Delta$Pim by the high frequency filter, and a component (hereinafter, this component is referred to as a "high frequency EGR ratio deviation component") $\Delta$RegrH of the EGR ratio deviation of the frequency higher than the predetermined frequency is extracted from the EGR ratio deviation $\Delta$Regr by the high frequency filter.

Further, as shown in FIG. 5, a component (hereinafter, this component is referred to as a "low frequency supercharging pressure deviation component") $\Delta$PimL of the supercharging pressure deviation of a frequency equal to or lower than a predetermined frequency is extracted by subtracting the extracted high frequency supercharging pressure deviation component $\Delta$PimH from the supercharging pressure deviation $\Delta$Pim, and a component (hereinafter, this component is referred to as a "low frequency EGR ratio deviation component") $\Delta$RegrL of the EGR ratio deviation of a frequency equal to or lower than a predetermined frequency is extracted by subtracting the extracted high frequency EGR ratio deviation component $\Delta$RegrH from the EGR ratio deviation $\Delta$Regr.

Further, as shown in FIG. 5, the amount (that is, the target EGR control valve opening degree change amount) Degr to change the current EGR control valve opening degree is calculated (that is, the high frequency supercharging pressure deviation component and the high frequency EGR ratio deviation component are converted into the target EGR control valve opening degree change amount) based on the extracted high frequency supercharging pressure deviation component $\Delta$PimH and the extracted high frequency EGR ratio deviation component $\Delta$RegrH so that these components become zero (or approach zero), and the amount (that is, the target vane opening degree change amount) Dv to change the current vane opening degree is calculated (that is, the low frequency supercharging pressure deviation component and the low frequency EGR ratio deviation component are converted into the target vane opening degree change amount) based on the extracted low frequency supercharging pressure deviation component $\Delta$PimL and the extracted low frequency EGR ratio deviation component $\Delta$RegrL so that these components become zero (or approach zero).

Further, as shown in FIG. 5, the operation amount Megr to be input to the EGR control valve so as to change the current EGR control valve opening degree by the calculated target EGR control valve opening degree change amount Degr is calculated and the operation amount is set to the target EGR control valve operation amount (that is, the target EGR control valve opening degree change amount Degr is converted into the target EGR control valve operation amount Megr). Also, the operation amount Mv to be input to the vane is calculated so as to change the current vane opening degree by the calculated target vane opening degree change amount Dv and the operation amount is set to the target vane operation amount (that is, the target vane opening degree change amount Dv is converted into the target vane operation amount Mv).

Further, in the first embodiment, the supercharging pressure and the EGR ratio which influence each other are respectively controlled at the target supercharging pressure and the target EGR ratio. However, the idea of the first embodiment may be also applied to a case where two different control amounts influencing each other are respectively controlled at the corresponding target control amount in addition to the combination of the supercharging pressure and the EGR ratio.

Further, in the first embodiment, the supercharging pressure and the EGR ratio are controlled by the vane and the EGR control valve. However, the idea of the first embodiment may be also applied to a case where the supercharging pressure and the EGR ratio are controlled by the control subject in which the frequencies of the supercharging pressure deviation and the EGR ratio deviation may be controlled even at a predetermined speed are different from each other in addition to the combination of the vane and the EGR control valve.

When the description of the first embodiment is taken into consideration, in the first embodiment, in the control device for an internal combustion engine including a first control subject (for example, the vane of the first embodiment) that may control a first control amount (for example, the supercharging pressure of the first embodiment) as one of two different control amounts widely influencing each other at a frequency lower than a predetermined frequency and a second control subject (for example, the EGR control valve of the first embodiment) that may control a second control amount (for example, the EGR ratio of the first embodiment) as the other of the control amount at a frequency equal to or higher than a predetermined frequency, the control device may change the second control amount by changing the operation state (for example, the vane opening degree of the first embodiment) of the first control subject so as to change the first control amount, change the first control amount by changing the operation state (for example, the EGR control valve opening degree of the first embodiment) of the second control subject so as to change the second control amount, control the first control amount at the first target control amount (for example, the target supercharging pressure of the first embodiment) to be the target control amount by the first control subject and the second control subject, and control the second control amount at the second target control amount (for example, the target EGR ratio of the first embodiment) to be the target control amount, where the operation amount (for example, the target vane operation amount of the first embodiment) which changes the operation state of the first control subject is input to the first control subject so that the component (for example, the low frequency supercharging pressure deviation component of the first embodiment) of the deviation that changes at a frequency lower than a predetermined frequency in the deviation (for example, the supercharging pressure deviation of the first embodiment) of the first control amount with respect to the first target control amount and the component (for example, the low frequency EGR ratio deviation component of the first embodiment) of the deviation that changes at a frequency lower than the predetermined frequency in the deviation (for example, the EGR ratio deviation of the first embodiment) of the second control amount with respect to the second target control amount become zero or approach zero and the operation amount (for example, the target EGR control valve operation amount of the first embodiment) which changes the operation state of the second control subject is input to the second control subject so that the component (for example, the high frequency supercharging pressure deviation component of the first embodiment) of the deviation that changes at a frequency equal to or higher than a predetermined frequency in the deviation of the first control amount with respect to the first target control amount and the component (for example, the high frequency EGR ratio deviation component of the first embodiment) of the deviation that changes at a frequency equal to or higher than a predetermined frequency in the deviation of the second control amount with respect to the second target control amount become zero or approach zero.

Next, an example of a routine of executing a setting of the target vane operation amount and the target EGR control valve operation amount according to the first embodiment will be described. This routine is shown in FIG. 6 and is executed at a predetermined time interval.

Figure 6:
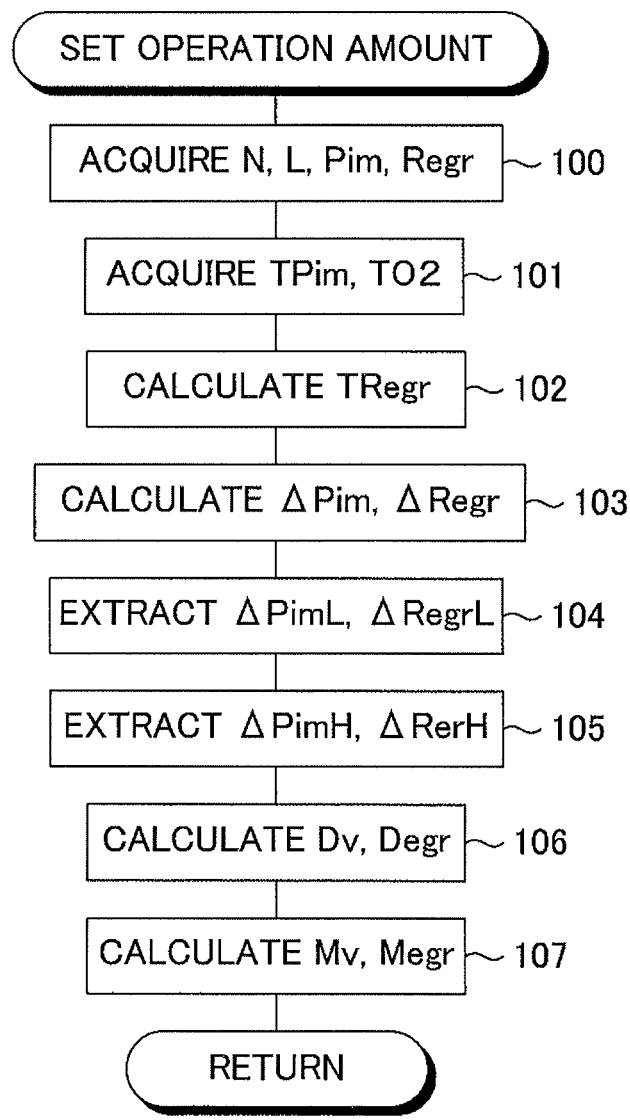
FIG. 6 is a diagram showing an example of a routine which executes the setting of the target vane operation amount and the target EGR control valve operation amount according to the first embodiment of the present invention.

When the routine of FIG. 6 starts, first, in step 100, the current engine rotation speed N, the current engine load L, the current supercharging pressure Pim, and the current EGR ratio Regr are obtained. Subsequently, in step 101, based on the engine rotation speed N and the engine load L obtained in step 100, the target supercharging pressure TPim is acquired from the map of FIG. 3(A), and the target oxygen concentration TO2 is acquired from the map of FIG. 3(B). Subsequently, in step 102, the target EGR ratio TRegr is calculated based on the target supercharging pressure TPim and the target oxygen concentration TO2 acquired in step 101.

Subsequently, in step 103, the deviation (that is, the supercharging pressure deviation) ΔPim of the current supercharging pressure Pim acquired in step 100 with respect to the target supercharging pressure TPim acquired in step 101 is calculated, and the deviation (that is, the EGR ratio deviation) ΔRegr of the current EGR ratio Regr acquired in step 100 with respect to the target EGR ratio TRegr calculated in step 102 is calculated.

Subsequently, in step 104, the low frequency supercharging pressure deviation component ΔPimL is extracted from the supercharging pressure deviation ΔPim calculated in step 103 by the low frequency filter, and the low frequency EGR ratio deviation component ΔRegrL is extracted from the EGR ratio deviation ΔRegr calculated in step 103 by the low frequency filter. Subsequently, in step 105, the high frequency supercharging pressure deviation component ΔPimH is extracted by subtracting the low frequency supercharging pressure deviation component ΔPimL extracted in step 104 from the supercharging pressure deviation ΔPim calculated in step 103, and the high frequency EGR ratio deviation component ΔRegrH is extracted by subtracting the low frequency EGR ratio deviation component ΔRegrL extracted in step 104 from the EGR ratio deviation ΔRegr calculated in step 103.

Subsequently, in step 106, the vane opening degree change amount (that is, the target vane opening degree change amount) Dv which causes the low frequency supercharging pressure deviation component ΔPimL and the low frequency EGR ratio deviation component ΔRegrL extracted in step 104 to become zero (or approach zero) based on these deviation components is calculated, and the EGR control valve opening degree change amount (that is, the target EGR control valve opening degree change amount) Degr which causes the high frequency supercharging pressure deviation component ΔPimH and the high frequency EGR ratio deviation component ΔRegrH extracted in step 105 to become zero (or approach zero) based on these deviation components is calculated.

Subsequently, in step 107, the operation amount (that is, the target vane operation amount) Mv to be input to the vane so as to change the vane opening degree by the target vane opening degree change amount Dv calculated in step 106 is calculated, the operation amount (that is, the target EGR control valve operation amount) Megr to be input to the EGR control valve so as to change the EGR control valve opening degree by the target EGR control valve opening degree change amount Degr calculated in step 106 is calculated, and then the routine ends.

Incidentally, since the flow rate of air passing the throttle valve increases when the throttle valve opening degree increases, the supercharging pressure increases. Further, at this time, since a difference between the supercharging pressure and the exhaust pressure decreases with an increase in the supercharging pressure, the EGR gas amount decreases. Meanwhile, since the flow rate of air passing the throttle valve decreases when the throttle valve opening degree decreases, the supercharging pressure decreases. Further, at this time, since a difference between the supercharging pressure and the exhaust pressure increases with a decrease in the supercharging pressure, the EGR gas amount increases. That is, when the throttle valve opening degree is changed, the supercharging pressure and the EGR ratio change.

Therefore, in the first embodiment, the vane opening degree is changed or the EGR control valve opening degree is changed so as to control the supercharging pressure at the target supercharging pressure and control the EGR ratio at the target EGR ratio, but the throttle valve opening degree may be changed in addition to this.

Next, described is a setting of the target vane operation amount, the target EGR control valve operation amount, and the target throttle valve operation amount (that is, the operation amount to be input to the throttle valve) according to the embodiment (hereinafter, referred to as a "second embodiment") in which the throttle valve opening degree is changed in addition to a change in the vane opening degree or the EGR control valve opening degree for the purpose of controlling the supercharging pressure at the target supercharging pressure and controlling the EGR ratio at the target EGR ratio.

In the second embodiment, as in the first embodiment, the current actual supercharging pressure and the current actual EGR ratio are acquired. Further, the deviation (that is, the supercharging pressure deviation) of the acquired actual supercharging pressure with respect to the target supercharging pressure TPim is calculated, and the deviation (that is, the EGR ratio deviation) of the acquired actual EGR ratio with respect to the target EGR ratio TRegr is calculated.

Figure 7:
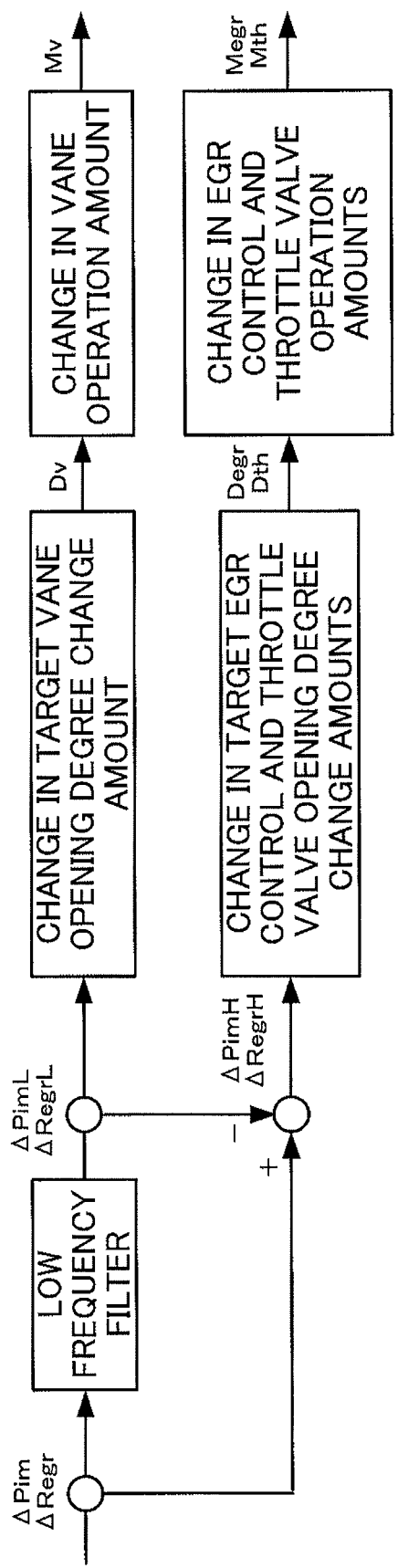
FIG. 7 is a diagram schematically showing a setting of a target vane operation amount, a target EGR control valve operation amount, and a target throttle valve operation amount according to a second embodiment of the present invention.

Further, as shown in FIG. 7, the component (that is, the low frequency supercharging pressure deviation component) ΔPimL of the supercharging pressure deviation of the frequency lower than a predetermined frequency is extracted from the calculated supercharging pressure deviation ΔPim by the low frequency filter, and the component (that is, the low frequency EGR ratio deviation component) ΔRegrL of the EGR ratio deviation of the frequency lower than a predetermined frequency is extracted from the calculated EGR ratio deviation ΔRegr by the low frequency filter.

Further, as shown in FIG. 7, the component (that is, the high frequency supercharging pressure deviation component) ΔPimH of the supercharging pressure deviation of a frequency equal to or higher than a predetermined frequency is extracted by subtracting the extracted low frequency supercharging pressure deviation component ΔPimL from the calculated supercharging pressure deviation ΔPim, and the component (that is, the high frequency EGR ratio deviation component) ΔRegrH of the EGR ratio deviation of a frequency equal to or higher than a predetermined frequency is extracted by subtracting the extracted low frequency EGR ratio deviation component ΔRegrL from the calculated EGR ratio deviation ΔRegr.

Further, as shown in FIG. 7, the amount to change the current vane opening degree (that is, the target vane opening degree change amount) Dv is calculated (that is, the low frequency supercharging pressure deviation component and the low frequency EGR ratio deviation component are converted into the target vane opening degree change amount) based on the extracted low frequency supercharging pressure deviation component ΔPimL and the extracted low frequency EGR ratio deviation component ΔRegrL so that these components become zero (or approach zero), and the amount to change the current EGR control valve opening degree (that is, the target EGR control valve opening degree change amount) Degr and the amount to change the current throttle valve opening degree (hereinafter, this amount is referred to as a "target throttle valve opening degree change amount") Dth are calculated (that is, the high frequency supercharging pressure deviation component and the high frequency EGR ratio deviation component are converted into the target EGR control valve opening degree change amount and the target throttle valve opening degree change amount) based on the extracted high frequency supercharging pressure deviation component ΔPimH and the extracted high frequency EGR ratio deviation component ΔRegrH so that these components become zero (or approach zero).

Further, as shown in FIG. 7, the operation amount Mv to be input to the vane so as to change the current vane opening degree by the calculated target vane opening degree change amount Dv is calculated, the operation amount is set to the target vane operation amount (that is, the target vane opening degree change amount Dv is converted into the target vane operation amount Mv), the operation amount Megr to be input to the EGR control valve so as to change the current EGR control valve opening degree by the calculated target EGR control valve opening degree change amount Degr is calculated, the operation amount is set to the target EGR control valve operation amount (that is, the target EGR control valve opening degree change amount Degr is converted into the target EGR control valve operation amount Megr), the operation amount Mth to be input to the throttle valve so as to change the current throttle valve opening degree by the calculated target throttle valve opening degree change amount Dth is calculated, and the operation amount is set to the target throttle valve operation amount (that is, the target throttle valve opening degree change amount Dth is converted into the target throttle valve operation amount Mth). In this way, in the second embodiment, the target vane operation amount, the target EGR control valve operation amount, and the target throttle valve operation amount are set.

Since the target vane operation amount, the target EGR control valve operation amount, and the target throttle valve operation amount set in this way are respectively input to the vane, the EGR control valve, and the throttle valve, the supercharging pressure and the EGR ratio may be respectively controlled at the target supercharging pressure and the target EGR ratio with sufficient followability.

Next, described is the reason why the supercharging pressure and the EGR ratio may be respectively controlled at the target supercharging pressure and the target EGR ratio with sufficient followability by respectively inputting the target vane operation amount, the target EGR control valve operation amount, and the target throttle valve operation amount set according to the second embodiment to the vane, the EGR control valve, and the throttle valve.

As described above, when the throttle valve opening degree increases, the supercharging pressure increases, so that the EGR gas amount decreases. When the throttle valve opening degree decreases, the supercharging pressure decreases, so that the EGR gas amount increases. Here, according to the present inventor's examination, it is proved that a change speed in the supercharging pressure and the EGR ratio caused by a change in the throttle valve opening degree is comparatively fast. Accordingly, it is possible to compensate the supercharging pressure deviation and the EGR ratio deviation that change for a comparatively short time by changing the throttle valve opening degree at the sufficient speed.

Here, in the second embodiment, the EGR ratio deviation is divided into the low frequency EGR ratio deviation component (that is, the component of the EGR ratio deviation that changes for a comparatively long time) and the high frequency EGR ratio deviation component (that is, the component of the EGR ratio deviation that changes for a comparatively short time), the supercharging pressure deviation is divided into the low frequency supercharging pressure deviation component (that is, the component of the supercharging pressure deviation that changes for a comparatively long time) and the high frequency supercharging pressure deviation component (that is, the component of the supercharging pressure deviation that changes for a comparatively short time), the high frequency EGR ratio deviation component and the high frequency supercharging pressure deviation component are compensated by changing the EGR control valve opening degree and the throttle valve opening degree, and the low frequency supercharging pressure deviation component and the low frequency EGR ratio deviation component are compensated by changing the vane opening degree.

Therefore, according to the second embodiment, since the supercharging pressure deviation and the EGR ratio deviation are reliably compensated at the sufficient speed, the supercharging pressure and the EGR ratio may be respectively controlled at the target supercharging pressure and the target EGR ratio with sufficient followability.

Further, according to the second embodiment, an effect can be obtained in which the supercharging pressure and the EGR ratio may be respectively controlled further reliably at the target supercharging pressure and the target EGR ratio with sufficient followability due to the following reason.

That is, the internal combustion engine includes the vane, the EGR control valve, and the throttle valve (that is, three control subjects) which control the supercharging pressure and the EGR ratio (that is, two control amounts) influencing each other. In a case where the supercharging pressure and the EGR ratio change with a change in the vane opening degree, the EGR control valve opening degree, and the throttle valve opening degree (that is, a change in the operation state of each control subject) (in other words, all control amounts change by changing the operation state of any one control subject), three target change amounts are determined based on a deviation between two control amounts when determining the target vane opening degree change amount, the target EGR control valve opening degree change amount, and the throttle valve opening degree change amount so that the supercharging pressure deviation and the EGR ratio deviation simultaneously become zero. That is, three target change amounts as the target vane opening degree change amount, the target EGR control valve opening degree change amount, and the throttle valve opening degree change amount are determined based on a deviation between two control amounts as the supercharging pressure deviation and the EGR ratio deviation. Incidentally, when the number of the control amount deviations as the basis for determining the target change amount is smaller than the number of the control subjects in this way, a plurality of combinations are calculated from the combination of the target change amounts for causing each control amount deviation to become zero. In this case, there is a need to determine which combination is optimal. However, there is a case in which it is difficult to determine which combination is optimal, and in this case, it is difficult to calculate the target change amount. Further, even when it is possible to determine which combination is optimal, the target change amount calculation load increases as much as the determination on the optimal combination and a long time is required for the calculation of the target change amount. In this case, each control amount control speed becomes slow.

Meanwhile, in the second embodiment, a group (that is, a group including one control subject) including the vane as the control subject capable of controlling the component (that is, the low frequency supercharging pressure deviation component and the low frequency EGR ratio deviation component) of the control amount deviation of the frequency lower than a predetermined frequency at a predetermined speed and a group (that is, a group including two control subjects) including the EGR control valve and the throttle valve as the control subject capable of controlling the component (that is, the high frequency supercharging pressure deviation component and the high frequency EGR ratio deviation component) of the control amount deviation of a frequency equal to or higher than a predetermined frequency at a predetermined speed may be adopted for the complementary cooperation purpose.

Further, during the engine operation, the component (that is, the low frequency supercharging pressure deviation component and the low frequency EGR ratio deviation component) of the control amount deviation corresponding to a frequency (that is, a frequency lower than a predetermined frequency) at which the vane grouped in one group is controlled at a predetermined speed is extracted, and the component (that is, the high frequency supercharging pressure deviation component and the high frequency EGR ratio deviation component) of the control amount deviation corresponding to a frequency (that is, a frequency equal to or higher than a predetermined frequency) at which the EGR control valve and the throttle valve grouped in the other group are controlled at a predetermined speed is extracted. That is, in this way, the component of a deviation between two control amounts as the low frequency supercharging pressure deviation component and the high frequency supercharging pressure deviation component is extracted from one supercharging pressure deviation, and the component of a deviation between two control amounts as the low frequency EGR ratio deviation component and the high frequency EGR ratio deviation component is extracted from one EGR ratio deviation. Further, the operation state of each control subject is controlled so that the components of the extracted control amount deviations become zero by the control subject of the group corresponding to a frequency corresponding to the component of each control amount deviation (that is, the vane as the control subject corresponding to the low frequency supercharging pressure deviation component and the low frequency EGR ratio deviation component and the EGR control valve and the throttle valve as the control subject corresponding to the high frequency supercharging pressure deviation component and the high frequency EGR ratio deviation component).

That is, regarding the group including the vane, one target change amount as the target vane opening degree change amount is determined based on the component of a deviation between two control amounts as the low frequency supercharging pressure deviation component and the low frequency EGR ratio deviation component. In other words, the number (that is, two in the second embodiment) of the component of the control amount deviation as the basis of determining the target vane opening degree change amount is larger than the number (that is, one in the second embodiment) of the control subject used to compensate (that is, zero) the component of the control amount deviation. In this case, since the calculation of the plurality of target vane opening degree change amounts as the target vane opening degree change amount is suppressed, there is no need to determine which target vane opening degree change amount is optimal.

Meanwhile, regarding the group including the EGR control valve and the throttle valve, two target change amounts as the target EGR control valve opening degree change amount and the target throttle valve opening degree change amount are determined based on the component of a deviation between two control amounts as the high frequency supercharging pressure deviation component and the high frequency EGR ratio deviation component. In other words, the number (that is, two in the second embodiment) of the components of the control amount deviation as the basis for determining the target EGR control valve opening degree change amount and the target throttle valve opening degree change amount is equal to the number (that is, two in the second embodiment) of the control subjects used to compensate (that is, zero) the component of the control amount deviation. In this case, since the calculation of the plurality of combinations as the combination of the target EGR control valve opening degree change amount and the target throttle valve opening degree change amount is suppressed, there is no need to determine which target amount is optimal.

Further, in the second embodiment, in the case where a controller for calculating the target vane opening degree change amount is designed, a controller may be designed which generates one output as the target vane opening degree change amount from two inputs as the low frequency supercharging pressure deviation component and the low frequency supercharging pressure deviation component. Further, in the case where a controller for calculating the target EGR control valve opening degree change amount and the target throttle valve opening degree change amount is designed, a controller may be designed which generates two outputs as the target EGR control valve opening degree change amount and the target throttle valve opening degree change amount from two inputs as the high frequency supercharging pressure deviation component and the high frequency EGR ratio deviation component. Accordingly, the redundancy of the controller which is necessary for the control of the supercharging pressure and the EGR ratio according to the second embodiment is lower than the redundancy of the controller which generates three outputs from two inputs.

Therefore, according to the second embodiment, an effect can be obtained in which the supercharging pressure and the EGR ratio may be respectively controlled further reliably at the target supercharging pressure and the target EGR ratio with sufficient followability.

Furthermore, in the second embodiment, the supercharging pressure and the EGR ratio which influence each other are respectively controlled at the target supercharging pressure and the target EGR ratio. However, the idea of the second embodiment may be also applied to a case where two different control amounts influencing each other are respectively controlled at the corresponding target control amount other than the combination of the supercharging pressure and the EGR ratio.

Further, in the second embodiment, the supercharging pressure and the EGR ratio are controlled by the vane, the EGR control valve, and the throttle valve. However, the idea of the second embodiment may be also applied to a case where the supercharging pressure and the EGR ratio are controlled by the control subject in which the frequencies of the supercharging pressure deviation and the EGR ratio deviation are controllable even at a predetermined speed are different from each other in addition to the combination of the vane, the EGR control valve, and the throttle valve.

When the description of the second embodiment is taken into consideration, in the second embodiment, in the control device for an internal combustion engine including the plurality of control subjects (for example, the vane, the EGR control valve, and the throttle valve of the second embodiment) controlling the plurality of control amounts (for example, the supercharging pressure and the EGR ratio of the second embodiment) widely influencing each other, where all control amounts change by changing the operation state (for example, the vane opening degree, the EGR control valve opening degree, and the throttle valve opening degree of the second embodiment) of each control subject, and the operation state of each control subject is controlled so as to control each control amount at each corresponding target control amount (for example, the target supercharging pressure and the target EGR ratio of the second embodiment). Here, when a deviation of the actual control amount with respect to each corresponding target control amount is denoted by the control amount deviation (for example, the supercharging pressure deviation and the EGR ratio deviation of the second embodiment), the plurality of frequency ranges (that is, a frequency range lower than the predetermined frequency and the frequency range equal to or higher than the predetermined frequency of the second embodiment) for grouping each control subject based on the frequency of the control amount deviation in which each control subject may be controlled at a predetermined speed, that is, the plurality of frequency ranges for grouping the control subjects equal to or smaller than the total number (for example, two in the second embodiment) of the control amounts in one group when grouping each control subject for each frequency range based on the frequency of the control amount deviation in which each control subject may be controlled at a predetermined speed are set, the component corresponding to each frequency range is extracted from each control amount deviation during the engine operation as the control amount deviation component (for example, in the second embodiment, the low frequency supercharging pressure deviation component and the low frequency EGR ratio deviation component as the component corresponding to a frequency lower than the predetermined frequency and the high frequency supercharging pressure deviation component and the high frequency EGR ratio deviation component as the component corresponding to a frequency equal to or higher than the predetermined frequency), and the operation state of each control subject is controlled so that the extracted control amount deviation components become zero by the control subject of the group corresponding to a frequency range corresponding to each control amount deviation component (for example, in the second embodiment, the low frequency supercharging pressure deviation component and the low frequency EGR ratio deviation component become zero by the vane and the high frequency supercharging pressure deviation component and the low frequency EGR ratio deviation component become zero by the EGR control valve and the throttle valve).

Further, in the second embodiment, a control theory such as a sliding mode control, a H∞ control, and an optimal regulator may be used in the design of the controller for generating two outputs as the target EGR control valve operation amount and the target throttle valve operation amount from two inputs as the high frequency EGR ratio deviation component and the high frequency supercharging pressure deviation component.

Figure 8:
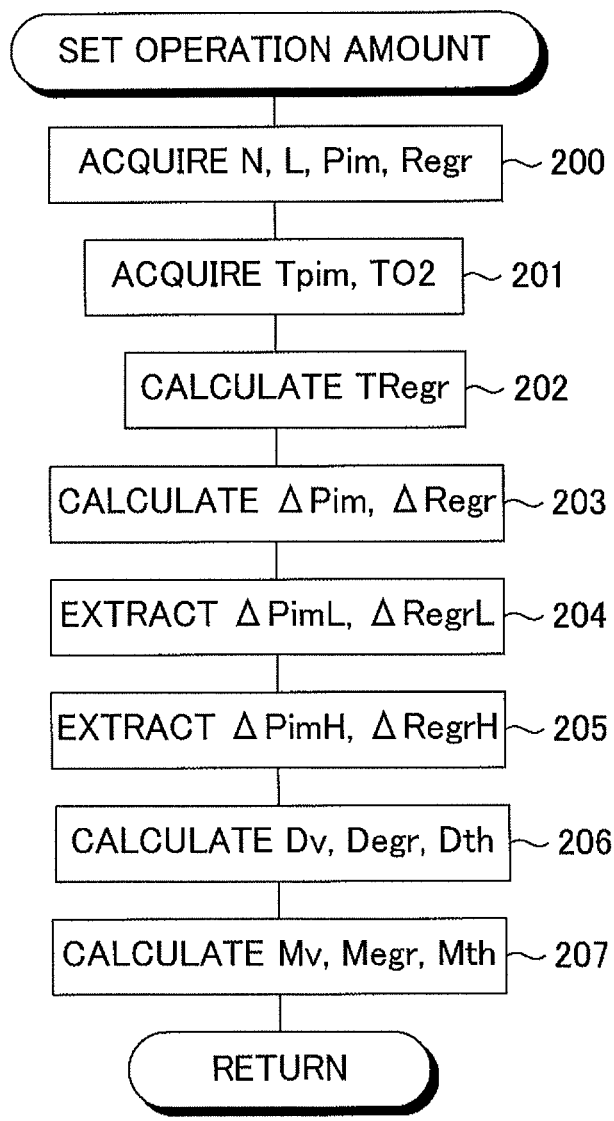
FIG. 8 is a diagram schematically showing the setting of the target vane operation amount, the target EGR control valve operation amount, and the target throttle valve operation amount according to the second embodiment of the present invention.

Next, an example of a routine of executing a setting of the target vane operation amount, the target EGR control valve operation amount, and the target throttle valve operation amount according to the second embodiment will be described. This routine is shown in FIG. 8 and is executed at a predetermined time interval. Furthermore, since step 200 to step 205 of the routine of FIG. 8 are the same as step 100 to step 105 of the routine of FIG. 6, the content of these steps is understood by referring to the description for step 100 to step 105 of the routine of FIG. 6.

In the routine of FIG. 8, in step 206, the vane opening degree change amount (that is, the target vane opening degree change amount) Dv capable of causing the low frequency supercharging pressure deviation component ΔPimL and the low frequency EGR ratio deviation component ΔRegrL extracted in step 204 to become zero (or approach zero) based on these components is calculated, and the EGR control valve opening degree change amount (that is, the target EGR control valve opening degree change amount) Degr and the throttle valve opening degree change amount (that is, the target throttle valve opening degree change amount) Dth capable of causing the high frequency supercharging pressure deviation component ΔPimH and the high frequency EGR ratio deviation component ΔRegrH extracted in step 205 to become zero (or approach zero) based on these components are calculated.

Subsequently, in step 207, the operation amount (that is, the target vane operation amount) My to be input to the vane so as to change the vane opening degree by the target vane opening degree change amount Dv calculated in step 206 is calculated, the operation amount (that is, the target EGR control valve operation amount) Megr to be input to the EGR control valve so as to change the EGR control valve opening degree by the target EGR control valve opening degree change amount Degr calculated in step 206 is calculated, the operation amount (that is, the target throttle valve operation amount) Mth to be input to the throttle valve so as to change the throttle valve opening degree by the target throttle valve opening degree change amount Dth calculated in step 206 is calculated, and then the routine ends.

Furthermore, in the aforementioned embodiments, in the internal combustion engine including the vane capable of compensating the component of the supercharging pressure deviation and the component of the EGR ratio deviation that change at the comparatively low frequency at the sufficient speed and the EGR control valve capable of compensating the component of the EGR ratio deviation and the component of the supercharging pressure deviation that change at the comparatively high frequency at the sufficient speed, the present invention is applied to the case where the supercharging pressure may be controlled at the target supercharging pressure so as to follow the predetermined target supercharging pressure and the EGR ratio is controlled at the target EGR ratio so as to follow the predetermined target EGR ratio. However, the present invention may be applied to the internal combustion engine including the control subject capable of compensating the component of the supercharging pressure deviation and the component of the EGR ratio deviation that change at the intermediate frequency at the sufficient speed in addition to the vane and the EGR control valve, where the supercharging pressure is controlled at the target supercharging pressure so as to follow the predetermined target supercharging pressure and the EGR ratio is controlled at the target EGR ratio so as to follow the predetermined target EGR ratio.

Furthermore, in this way, in the case where the internal combustion engine includes a control subject (hereinafter, this control subject is referred to as an "additional control subject") capable of compensating the component of the supercharging pressure deviation and the component of the EGR ratio deviation that change at the intermediate frequency at the sufficient speed, the target vane operation amount, the target EGR control valve operation amount, and the target control subject operation amount (that is, the operation amount to be input to the additional control subject) may be set as described below.

That is, in this case, the component (hereinafter, this component is referred to as a "low frequency supercharging pressure deviation component") of the supercharging pressure deviation of the frequency lower than the predetermined low frequency is extracted from the supercharging pressure deviation by the low frequency filter, and the component (hereinafter, this component is referred to as a "low frequency EGR ratio deviation component") of the EGR ratio deviation of the frequency lower than the predetermined low frequency is extracted from the EGR ratio deviation by the low frequency filter.

Meanwhile, the component (hereinafter, this component is referred to as a "high frequency supercharging pressure deviation component") of the supercharging pressure deviation of the frequency higher than the predetermined high frequency (the predetermined high frequency is the frequency higher than the predetermined low frequency) is extracted from the supercharging pressure deviation by the high frequency filter, and the component (hereinafter, this component is referred to as a "high frequency EGR ratio deviation component") of the EGR ratio deviation of the frequency higher than the predetermined high frequency is extracted from the EGR ratio deviation by the high frequency filter.

Further, the component (hereinafter, this component is referred to as an "intermediate frequency supercharging pressure deviation component") of the supercharging pressure deviation of a frequency equal to or higher than the predetermined low frequency and equal to or lower than the predetermined high frequency is extracted by subtracting the extracted low frequency supercharging pressure deviation component and the extracted high frequency supercharging pressure deviation component from the supercharging pressure deviation, and the component (hereinafter, this component is referred to as an "intermediate frequency EGR ratio deviation component") of the EGR ratio deviation of a frequency equal to or higher than the predetermined low frequency and equal to or lower than the predetermined high frequency is extracted by subtracting the extracted low frequency EGR ratio deviation component and the extracted high frequency EGR ratio deviation component from the EGR ratio deviation.

Further, the amount to change the current vane opening degree (hereinafter, this amount is referred to as a "target vane opening degree change amount") so as to cause the calculated low frequency supercharging pressure deviation component and the calculated low frequency EGR ratio deviation component to become zero (or approach zero) based on these components is calculated, the amount to change the current EGR control valve opening degree (hereinafter, this amount is referred to as a "target EGR control valve opening degree change amount") so as to cause the calculated high frequency supercharging pressure deviation component and the calculated high frequency EGR ratio deviation component to become zero (or approach zero) based on these components is calculated, and the amount to change the operation state of the current additional control subject (hereinafter, this amount is referred to as a "target control subject change amount") so as to cause the calculated intermediate frequency supercharging pressure deviation component and the calculated intermediate frequency EGR ratio deviation component to become zero (or approach zero) based on these components is calculated.

Further, the operation amount (that is, the target vane operation amount) to be input to the vane so as to change the current vane opening degree by the calculated target vane opening degree change amount is calculated (that is, set), the operation amount (that is, the target EGR control valve operation amount) to change the current EGR control valve opening degree by the calculated target EGR opening degree change amount is calculated (that is, set), and the operation amount (that is, the target control subject operation amount) to be input to the additional control subject so as to change the operation state of the current additional control subject by the calculated target control subject change amount is calculated (that is, set).

Furthermore, as the aforementioned additional control subject, for example, a supercharger smaller than the supercharger of the aforementioned embodiment may be exemplified. That is, in the supercharger smaller than the supercharger of the aforementioned embodiment, a time necessary to change the vane opening degree of the compact supercharger and start to change the supercharging pressure with a change in the vane opening degree is shorter than a time necessary to change the vane opening degree of the supercharger of the aforementioned embodiment and start to change the supercharging pressure with a change in the vane opening degree. Therefore, according to the compact supercharger, it is possible to compensate the component of the supercharging pressure deviation and the component of the EGR ratio deviation that change at the intermediate frequency at the sufficient speed.

Further, as described above, the supercharging pressure and the EGR ratio change when the throttle valve opening degree changes. Therefore, in the first embodiment, the EGR control valve is used so as to control the supercharging pressure at the target supercharging pressure and control the EGR ratio at the target EGR ratio, and particularly when the EGR device includes the EGR control valve, the throttle valve may be used. In this case, the target vane operation amount and the target throttle valve operation amount may be set in this way.

That is, in this case, the low frequency supercharging pressure deviation component is extracted from the supercharging pressure deviation by the low frequency filter, and the low frequency EGR ratio deviation component is extracted from the EGR ratio deviation by the low frequency filter. Further, the high frequency supercharging pressure deviation component is extracted by subtracting the extracted low frequency supercharging pressure deviation component from the supercharging pressure deviation, and the high frequency EGR ratio deviation component is extracted by subtracting the extracted low frequency EGR ratio deviation component from the EGR ratio deviation.

Further, the amount (that is, the target vane opening degree change amount) to change the current vane opening degree so that the extracted low frequency supercharging pressure deviation component and the extracted low frequency EGR ratio deviation component become zero (or approach zero) based on these components is calculated, and the amount (that is, the target throttle valve opening degree change amount) to change the current throttle valve opening degree so that the extracted high frequency supercharging pressure deviation component and the extracted high frequency EGR ratio deviation component become zero (or approach zero) based on these components is calculated.

Further, the operation amount (that is, the target vane operation amount) to be input to the vane so as to change the current vane opening degree by the calculated target vane opening degree change amount is calculated (that is, set), and the operation amount (that is, the target throttle valve operation amount) to be input to the throttle valve so as to change the current throttle valve opening degree by the calculated target throttle valve opening degree change amount is calculated.

Further, in the aforementioned embodiments, an embodiment is described in which the present invention is applied to the case where the actual supercharging pressure is controlled at the target supercharging pressure and the actual EGR ratio is controlled at the target EGR ratio in the compression self ignition type internal combustion engine. However, the present invention may be also applied to a case where the actual supercharging pressure is controlled at the target supercharging pressure and the actual EGR ratio is controlled at the target EGR ratio in a spark ignition type internal combustion engine (that is, a so-called gasoline engine).

The invention claimed is:

1. A control device for an internal combustion engine comprising: a first control subject capable of controlling first and second control amounts influencing each other at a frequency lower than a predetermined frequency; and a second control subject capable of controlling the first and second control amounts at a frequency equal to or higher than the predetermined frequency, wherein the control device comprises a control part for inputting operation amounts to the first and second control subjects, respectively, so as to change operation states of the first and second control subjects; wherein the control part inputs an operation to the first control subject so that a first low-frequency component of a first deviation of the first control amount with respect to a first target control amount and a second low-frequency component of a second deviation of the second control amount with respect to a second target control amount become zero or approach zero, the first and second low-frequency components being components of the first and second deviations, respectively, which change at a frequency lower than the predetermined frequency, and wherein the control part inputs an operation amount to the second control subject so that a first high-frequency component of a first deviation first target control and a second high-frequency component of a the second deviation that become zero or approach zero, the first and second high-frequency components being components of the first and second deviations, respectively, which change at a frequency higher than or equal to the predetermined frequency.

2. The control device for the engine according to claim 1, wherein the engine includes:
a supercharger which increases a pressure of an intake gas suctioned into a combustion chamber of the engine, and
an exhaust gas recirculation device which introduces an exhaust gas, discharged from the combustion chamber to an exhaust passage, into an intake passage and introduces the exhaust gas into the combustion chamber as an EGR gas,
wherein the supercharger includes a pressure control means for variably controlling the pressure of the intake gas and
the exhaust gas recirculation device includes an exhaust gas amount control means for variably controlling the amount of the EGR gas, and
wherein the first control subject is the pressure control means,
the second control subject is the exhaust gas amount control means,
the first control amount is the pressure of the intake gas, and
the second control amount is the amount of the EGR gas.

3. The control device for the engine according to claim 1, wherein the engine includes:
a supercharger which increases a pressure of an intake gas suctioned into a combustion chamber of the engine;
an exhaust gas recirculation device which introduces an exhaust gas, discharged from the combustion chamber to an exhaust passage, into an intake passage and introduces the exhaust gas into the combustion chamber as an EGR gas; and
a throttle valve which controls the amount of the intake gas,
wherein the supercharger includes a pressure control means for variably controlling the pressure of the intake gas, and
wherein the first control subject is the pressure control means,
the second control subject is the throttle valve,
the first control amount is the pressure of the intake gas, and
the second control amount is the amount of the EGR gas.

4. The control device for the engine according to claim 1, wherein the engine includes: a supercharger which increases a pressure of an intake gas suctioned into a combustion chamber of the engine; an exhaust gas recirculation device which introduces an exhaust gas, discharged from the combustion chamber to an exhaust passage, into an intake passage and introduces the exhaust gas into the combustion chamber as an EGR gas; and a throttle valve which controls the amount of the intake gas, wherein the supercharger includes a pressure control means for variably controlling the pressure of the intake gas, and the exhaust gas recirculation device includes an exhaust gas amount control means for variably controlling the amount of the EGR gas, and wherein the first control subject is the pressure control means, the second control subject is the exhaust gas amount control means and the throttle valve, the first control amount is the pressure of the intake gas, and the second control amount is the amount of the EGR gas.

5. A control device for an internal combustion engine comprising:
a plurality of control subjects controlling a plurality of control amounts influencing each other, wherein the control device comprises a control part for inputting operation amounts to the control subjects, respectively, so as to change operation states of the control subjects, wherein the control part inputs an operation amount(s) to a first group of the control subject(s) so that a first frequency component of a deviation of each control amount with respect to a corresponding target control amount becomes zero or approaches zero, the control subject(s) of the first group being capable of controlling the control amount(s) at a frequency within a first frequency range and at a predetermined speed, the number of the control subject(s) of the first group being smaller than or equal to the total number of the control amounts, the first frequency component being a component of the deviation which changes at a frequency within the first frequency range, and wherein the control part inputs an operation amount(s) to a second group of the control subject(s) so that a second frequency component of the deviation becomes zero or approaches zero, the control subject(s) of the second group being capable of controlling the control amount(s) at a frequency within a second frequency range and at the predetermined speed, the number of the control subject(s) of the second group being smaller than or equal to the total number of the control amounts, the second frequency component being a component of the deviation which changes at a frequency within the second frequency range.

6. The control device for the engine according to claim 5, wherein the engine includes:
   a supercharger which increases a pressure of an intake gas suctioned into a combustion chamber of the engine;
   an exhaust gas recirculation device which introduces an exhaust gas, discharged from the combustion chamber to an exhaust passage, into an intake passage and introduces the exhaust gas into the combustion chamber as an EGR gas; and
   a throttle valve which controls the amount of the intake gas,
   wherein the supercharger includes a pressure control means for variably controlling the pressure of the intake gas and the exhaust gas recirculation device includes an exhaust gas amount control means for variably controlling the amount of the EGR gas,
   wherein the control subject of the first group is the pressure control means and the control subjects of the second group are the exhaust gas amount control means and the throttle valve, and
   wherein the control amounts are the pressure of the intake gas and the amount of the EGR gas.

* * * * *